United States Patent
Dellaca et al.

(10) Patent No.: US 11,071,670 B2
(45) Date of Patent: Jul. 27, 2021

(54) REVERSIBLE LIFT SPRING FOR RAISING AND LOWERING A MEDICAL BED FIFTH WHEEL

(71) Applicant: Huntleigh Technology Limited, Dunstable (GB)

(72) Inventors: Thomas Anthony Dellaca, San Antonio, TX (US); Kevin Scott Wilson, San Antonio, TX (US)

(73) Assignee: Huntleigh Technology Limited, Bedfordshire (GB)

( * ) Notice: Subject to any disclaimer, the term of this patent is extended or adjusted under 35 U.S.C. 154(b) by 21 days.

(21) Appl. No.: 16/613,651

(22) PCT Filed: May 8, 2018

(86) PCT No.: PCT/EP2018/061845
§ 371 (c)(1),
(2) Date: Nov. 14, 2019

(87) PCT Pub. No.: WO2018/210626
PCT Pub. Date: Nov. 22, 2018

(65) Prior Publication Data
US 2020/0069492 A1 Mar. 5, 2020

Related U.S. Application Data

(60) Provisional application No. 62/506,447, filed on May 15, 2017.

(51) Int. Cl.
*A61G 1/02* (2006.01)
*A61G 7/08* (2006.01)
*F16F 9/02* (2006.01)

(52) U.S. Cl.
CPC ............ *A61G 7/08* (2013.01); *A61G 1/0268* (2013.01); *F16F 9/02* (2013.01)

(58) Field of Classification Search
CPC ............ A61G 7/08; A61G 1/0268; F16F 9/02
See application file for complete search history.

(56) References Cited

U.S. PATENT DOCUMENTS 3,304,116 A * 2/1967 Stryker ................ A61G 7/0507
296/20
3,305,876 A * 2/1967 Hutt ....................... A61G 7/012
5/11

(Continued)

FOREIGN PATENT DOCUMENTS

| CN | 2506241 Y | 8/2002 |
|---|---|---|
| WO | 2014040578 A1 | 3/2014 |

*Primary Examiner* — Erez Gurari
(74) *Attorney, Agent, or Firm* — The Webb Law Firm

(57) ABSTRACT

A retractable wheel system includes a rotatable member, a swing arm attached to the rotatable member and a wheel, a swing mount attached to the rotatable member, and a spring member. The spring member is attached to the swing mount at a connection point on a first end and to the swing arm on a second end. The spring member is rotatable relative to the swing mount at the connection point. The spring member is configured to apply a force in an upward direction when the connection point is above a line extending between a wheel attachment point and a swing arm rotation point of the swing arm and a force in a downward direction when the connection point is below the line of the swing arm. A transportation unit including the retractable wheel system is also disclosed.

20 Claims, 40 Drawing Sheets

(56) References Cited

U.S. PATENT DOCUMENTS

| | | | |
|---|---|---|---|
| 5,348,326 A * | 9/1994 | Fullenkamp | A61G 7/00 280/43 |
| 6,330,926 B1 * | 12/2001 | Heimbrock | A61G 7/018 180/65.1 |
| 2004/0139545 A1 | 7/2004 | Reinke et al. | |
| 2007/0151027 A1 * | 7/2007 | Hensley | A61G 7/05 5/430 |
| 2010/0088846 A1 * | 4/2010 | Salus | B60B 33/0023 16/34 |
| 2012/0198620 A1 * | 8/2012 | Hornbach | A61G 7/08 5/510 |
| 2013/0299252 A1 * | 11/2013 | Block | B60K 1/02 180/15 |
| 2018/0289566 A1 * | 10/2018 | Talati | A61G 1/048 |
| 2019/0142667 A1 * | 5/2019 | Paul | A61G 7/012 5/600 |
| 2019/0201255 A1 * | 7/2019 | Paul | A61G 7/05 |
| 2019/0201256 A1 * | 7/2019 | Derenne | A61G 1/0287 |
| 2019/0209406 A1 * | 7/2019 | Wilson | A61G 7/08 |
| 2019/0328594 A1 * | 10/2019 | Meng | A61G 7/0528 |
| 2020/0155384 A1 * | 5/2020 | Derenne | A61G 1/0268 |

\* cited by examiner

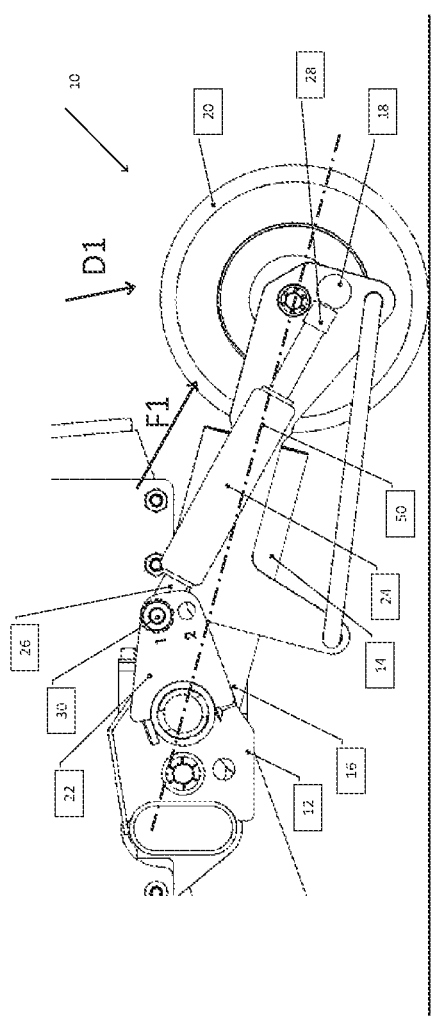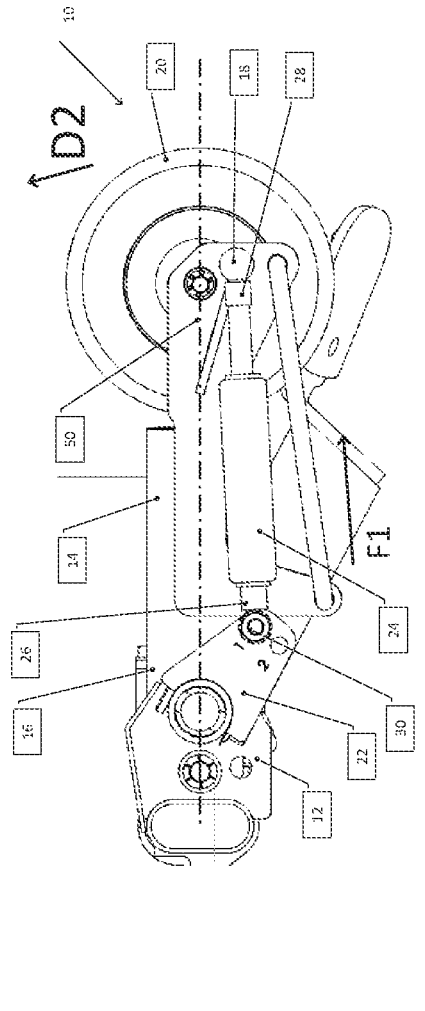
Fig. 5A
Fig. 5B

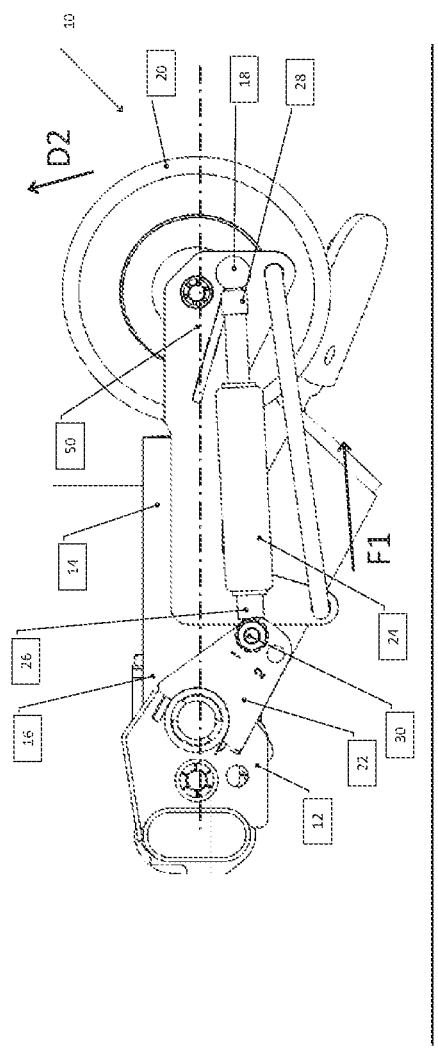

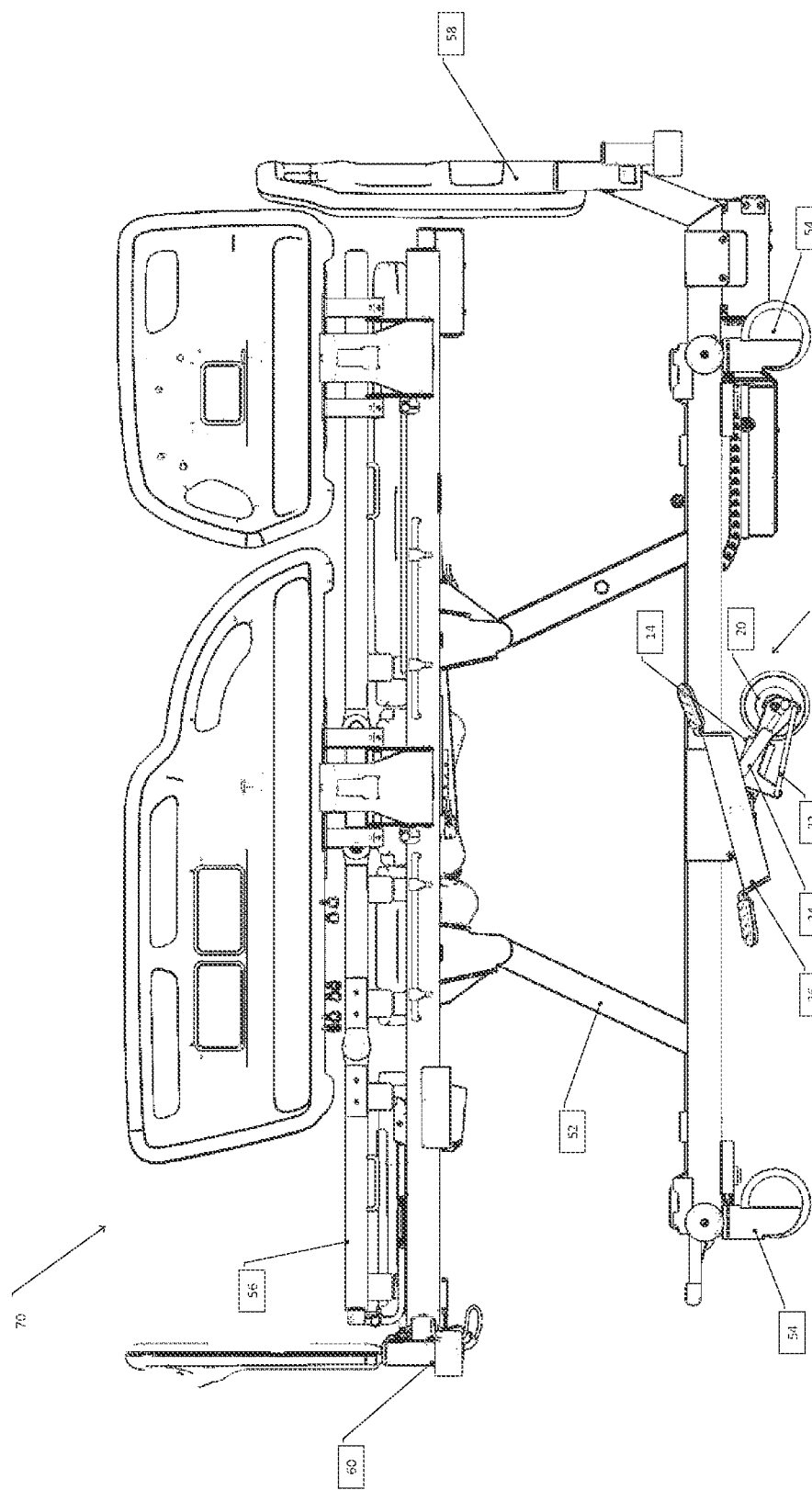

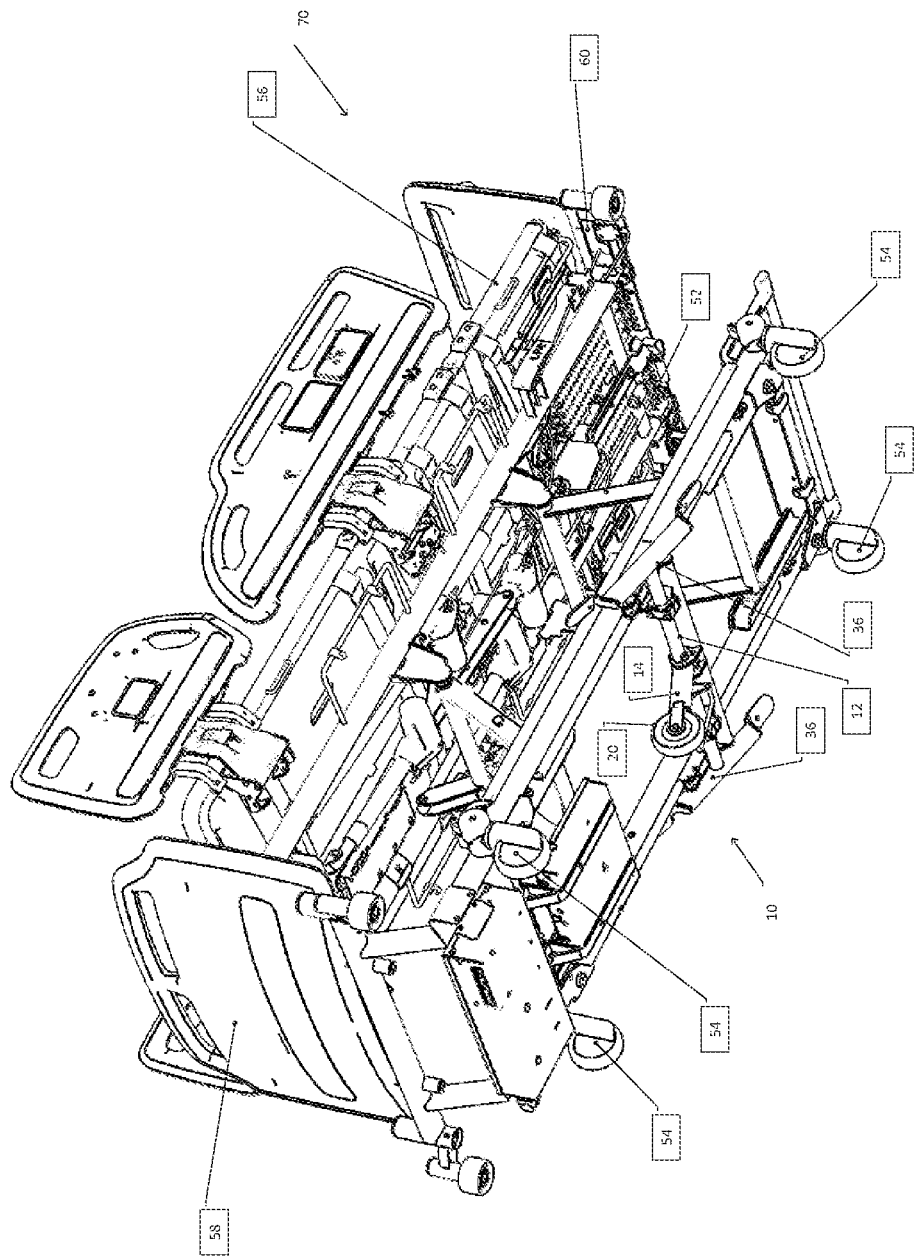

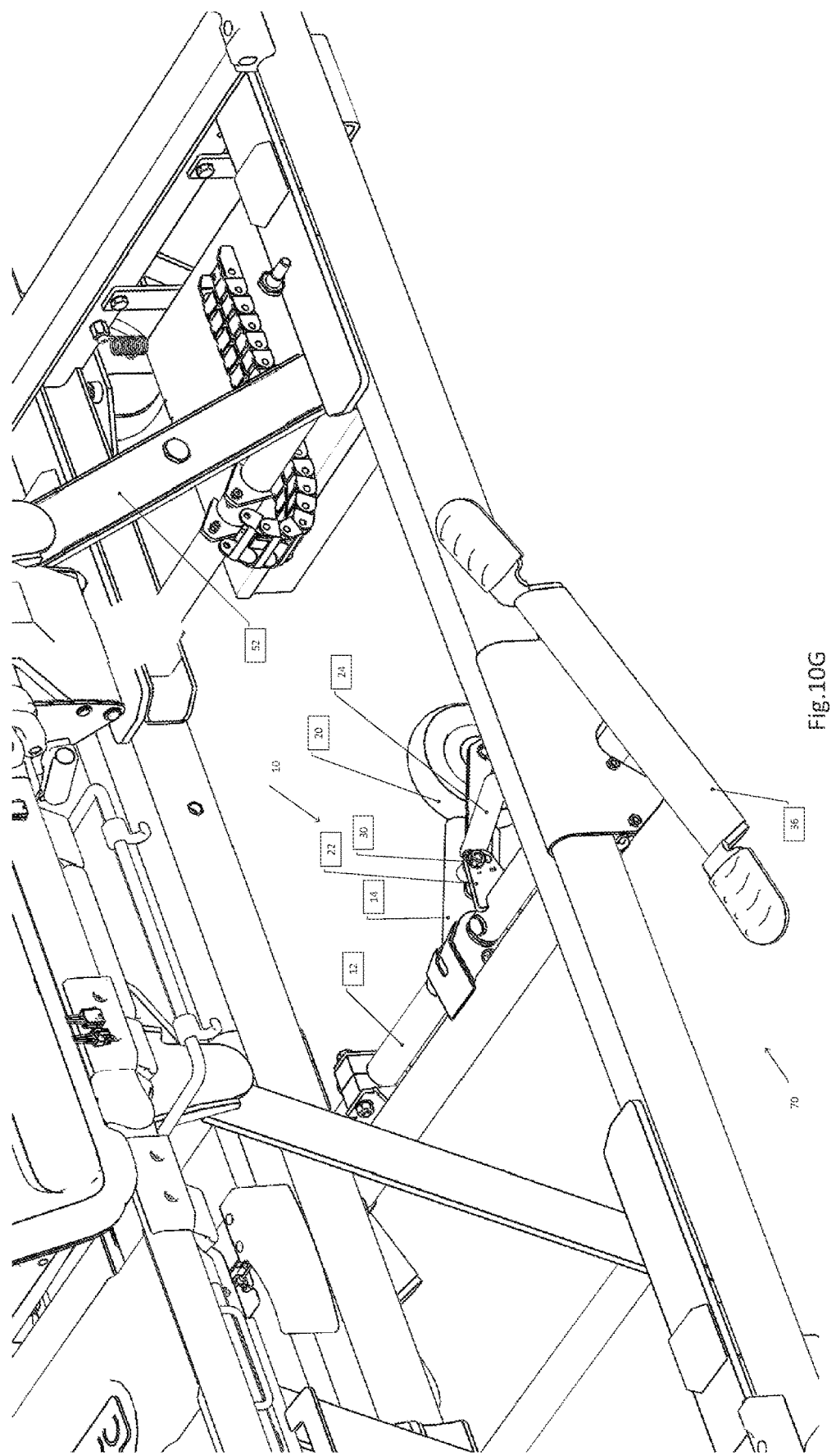

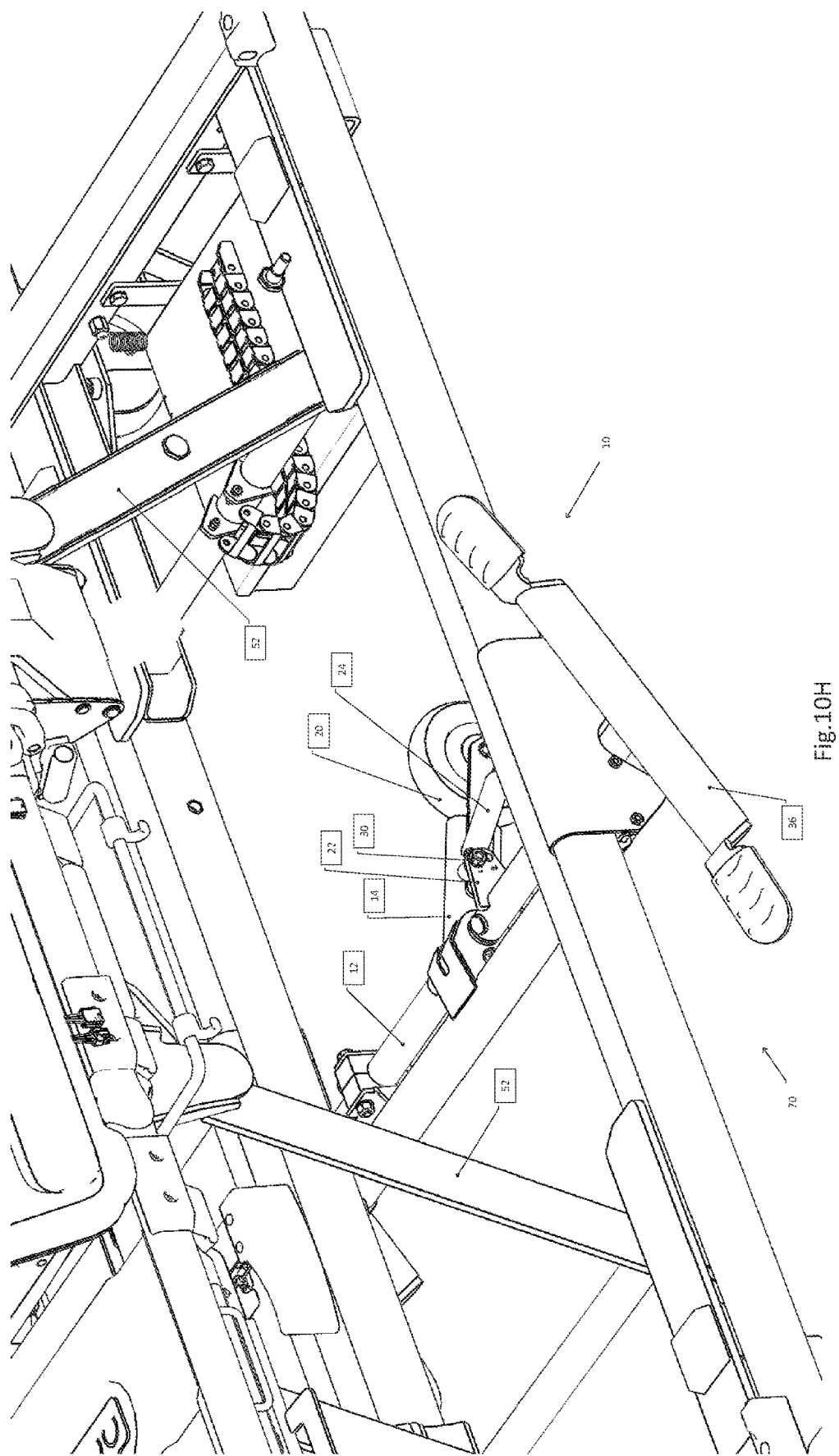

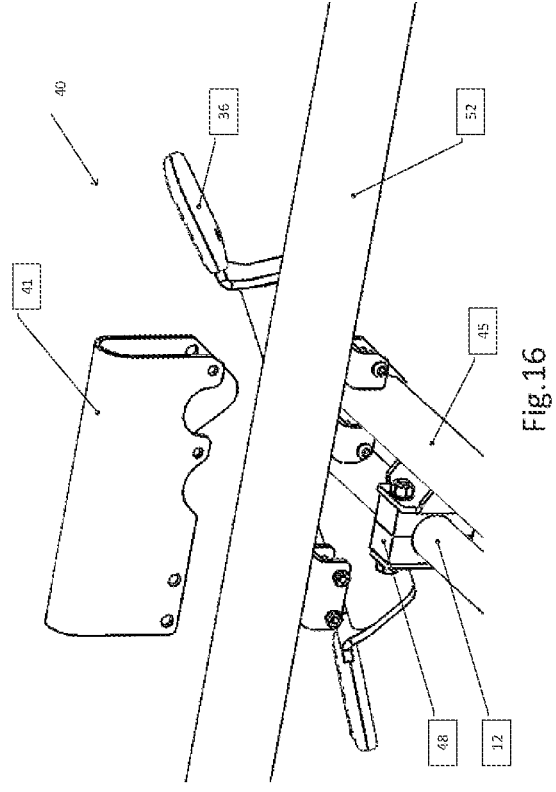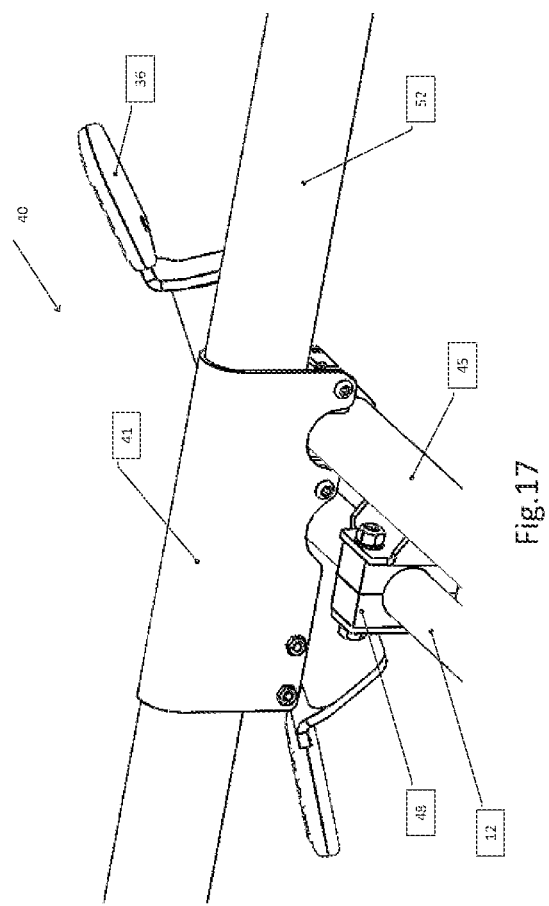

REVERSIBLE LIFT SPRING FOR RAISING AND LOWERING A MEDICAL BED FIFTH WHEEL

CROSS-REFERENCE TO RELATED APPLICATIONS

This application is the United States national phase of International Application No. PCT/EP2018/061845 filed May 8, 2018, and claims priority to U.S. Provisional Patent Application No. 62/506,447 filed May 15, 2017, the disclosures of which are hereby incorporated by reference in their entirety.

BACKGROUND OF THE INVENTION

Field of the Invention

The present invention relates to medical beds to transport patients, and, more particularly, to a retractable wheel system for use in the medical beds.

Description of Related Art

Medical beds are used to provide support to the patients as they lay in the medical bed in a hospital room, and the medical bed may be kept in a stationary position. However, medical beds are also used to transport patients throughout the hospital without transferring the patient from the hospital bed to another transportation unit. Therefore, medical beds commonly have wheels attached to the frame to allow for transportation.

In some designs, the medical bed includes four wheels located at the corners of the medical bed. A "fifth wheel" can be included and located between the four wheels proximate the center of the medical bed. The fifth wheel allows for easier steering of the medical bed during transportation and allows the medical bed to be more easily maneuvered into tight spaces. The fifth wheel may be retractable so that it is only in the down position during transportation.

Fifth wheel designs require a locking mechanism that locks the fifth wheel in a retracted, up position when not in transit and an extended, down position when in transit. The lock is required to secure the fifth wheel in the desired position because the wheel would otherwise change positions if not locked. In addition, fifth wheel designs require additional mechanisms beyond the locking mechanism to move the fifth wheel between the up and down positions. Example additional mechanisms include hydraulic pumps, additional springs, electromechanical mechanisms, lever arms, and the like.

These fifth wheel designs are often more susceptible to damage, given the number of components required to raise, lower, and lock the fifth wheel. In addition, these designs require adequate space under the medical beds, which is normally already at a premium. Therefore, many fifth wheel designs cannot merely be retrofitted to an existing medical bed, but the medical bed must be specifically designed to include the fifth wheel.

Therefore, there is a need in the art for a fifth wheel system for use in a medical bed that offers a simple, effective design for refraction and extension of the fifth wheel. Further there is a need for a fifth wheel system design that is simple enough so as to minimize any susceptibility to damage and compact enough to fit with any existing medical bed design. Finally, there is a need for a fifth wheel system that does not require the wheel to be locked in the up or down position or include additional components to raise or lower the fifth wheel.

SUMMARY OF THE INVENTION

The present invention is directed to a retractable wheel system including: a rotatable member; a swing arm comprising a first end attached to the rotatable member and a second end attached to a wheel; a swing mount attached to the rotatable member; and a spring member having a first end attached to the swing mount at a connection point and a second end attached to the second end of the swing arm, such that the spring member is rotatable relative to the swing mount at the connection point. The spring member is configured to apply a force in a downward direction when the connection point is above a line extending between a wheel attachment point and a swing arm rotation point.

The present invention is also directed to a transportation unit including: a frame; a plurality of wheels attached to the frame; and a retractable wheel system including: a rotatable member attached to the frame; a swing arm comprising a first end attached to the rotatable member and a second end attached to a wheel; a swing mount attached to the rotatable member; and a spring member having a first end attached to the swing mount at a connection point and a second end attached to the second end of the swing arm, such that the spring member is rotatable relative to the swing mount at the connection point. The spring member is configured to apply a force in a downward direction when the connection point is above a line extending between a wheel attachment point and a swing arm rotation point. The wheel of the retractable wheel system is positioned between the plurality of wheels.

The present invention is also directed to a method of attaching a retractable $5^{th}$ wheel assembly to a bed including: providing a retractable wheel system including: a rotatable member; a swing arm comprising a first end attached to the rotatable member and a second end attached to a wheel; a swing mount attached to the rotatable member; and a spring member having a first end attached to the swing mount at a connection point and a second end attached to the second end of the swing arm, such that the spring member is rotatable relative to the swing mount at the connection point. The spring member is configured to apply a force in a downward direction when the connection point is above a line extending between a wheel attachment point and a swing arm rotation point. The method further includes providing a medical bed comprising a frame and attaching the retractable wheel system to the frame.

Further aspects will now be described in the following numbered clauses.

Clause 1: A retractable wheel system comprising: a rotatable member; a swing arm comprising a first end attached to the rotatable member and a second end attached to a wheel; a swing mount attached to the rotatable member; and a spring member having a first end attached to the swing mount at a connection point and a second end attached to the second end of the swing arm, such that the spring member is rotatable relative to the swing mount at the connection point, wherein the spring member is configured to apply a force in a downward direction when the connection point is above a line extending between a wheel attachment point and a swing arm rotation point.

Clause 2: The system of clause 1, wherein the spring member is a gas spring.

Clause 3: The system of clause 1 or 2, wherein rotation of the rotatable member changes the position of the connection point relative to the line of the swing arm.

Clause 4: The system of any of the preceding clauses, wherein the line extends through an axis or centerline of the swing arm, and further comprising a first extended position in which the connection point is above the line and a second refracted position in which the connection point is below the line, wherein rotation of the rotatable member is configured to move the system between the first extended position to the second retracted position.

Clause 5: The system of clause 4, wherein rotation of the rotatable member is effected manually.

Clause 6: The system of clause 5, wherein manual rotation of the rotatable member is effected by a rotatable pedal co-acting with the rotatable member.

Clause 7: The system of clause 4, wherein rotation of the rotatable member is effected by a motor.

Clause 8: The system of any of clauses 4-7, wherein the system does not include a locking mechanism to hold the system in the first extended position or the second retracted position.

Clause 9: The system of any of the preceding clauses, wherein the system is configured to be retrofitted onto a transportation unit.

Clause 10: The system of clause 9, wherein the transportation unit is a medical bed.

Clause 11: A transportation unit comprising: a frame; a plurality of wheels attached to the frame; and a retractable wheel system comprising: a rotatable member attached to the frame; a swing arm comprising a first end attached to the rotatable member and a second end attached to a wheel; a swing mount attached to the rotatable member; and a spring member having a first end attached to the swing mount at a connection point and a second end attached to the second end of the swing arm, such that the spring member is rotatable relative to the swing mount at the connection point, wherein the spring member is configured to apply a force in a downward direction when the connection point is above a line extending between a wheel attachment point and a swing arm rotation point, and wherein the wheel of the retractable wheel system is positioned between the plurality of wheels.

Clause 12: The transportation unit of clause 11, wherein the spring member is a gas spring.

Clause 13: The transportation unit of clause 11 or 12, wherein rotation of the rotatable member changes the position of the connection point relative to the line of the swing arm.

Clause 14: The transportation unit of any of clauses 11-13, wherein the line extends through an axis or centerline of the swing arm, and further comprising a first extended position in which the connection point is above the line and a second refracted position in which the connection point is below the line, wherein rotation of the rotatable member is configured to move the system between the first extended position to the second retracted position.

Clause 15: The transportation unit of clause 14, wherein rotation of the rotatable member is effected manually.

Clause 16: The transportation unit of clause 15, wherein manual rotation of the rotatable member is effected by a rotatable pedal co-acting with the rotatable member.

Clause 17: The transportation unit of clause 14, wherein rotation of the rotatable member is effected by a motor.

Clause 18: The transportation unit of any of clauses 14-17, wherein the system does not include a locking mechanism to hold the system in the first extended position or the second retracted position.

Clause 19: The transportation unit of any of clauses 11-18, wherein the plurality of wheels includes four wheels.

Clause 20: The transportation unit of any of clauses 11-19, wherein the wheel of the retractable wheel system is positioned to steer the transportation unit during transportation of the transportation unit.

Clause 21: The transportation unit of any of clauses 11-20, wherein the transportation unit is a medical bed.

Clause 22. A method of attaching a retractable $5^{th}$ wheel assembly to a bed comprising: providing a retractable wheel system comprising: a rotatable member; a swing arm comprising a first end attached to the rotatable member and a second end attached to a wheel; a swing mount attached to the rotatable member; and a spring member having a first end attached to the swing mount at a connection point and a second end attached to the second end of the swing arm, such that the spring member is rotatable relative to the swing mount at the connection point, wherein the spring member is configured to apply a force in a downward direction when the connection point is above a line extending between a wheel attachment point and a swing arm rotation point; providing a medical bed comprising a frame; and attaching the retractable wheel system to the frame.

These and other features and characteristics of the present invention, as well as the methods of operation and functions of the related elements of the system, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the disclosure. As used in the specification and claims, the singular form of "a", "an", and "the" include plural referents unless the context clearly dictates otherwise.

BRIEF DESCRIPTION OF THE DRAWINGS

FIGS. 5A-5C show side views of a retractable wheel system in various positions according to various aspects of the present disclosure;

FIGS. 8A-8C show several views of a medical bed including a retractable wheel system according to various aspects of the present disclosure with the retractable wheel system in a down position;

FIGS. 10A-10H show several views of medical beds including a retractable wheel system according to various aspects of the present disclosure;

FIG. 16 shows another perspective view of the mounting unit of FIG. 14;

FIG. 17 shows another perspective view of the mounting unit of FIG. 14;

DESCRIPTION OF THE INVENTION

Figure 1:
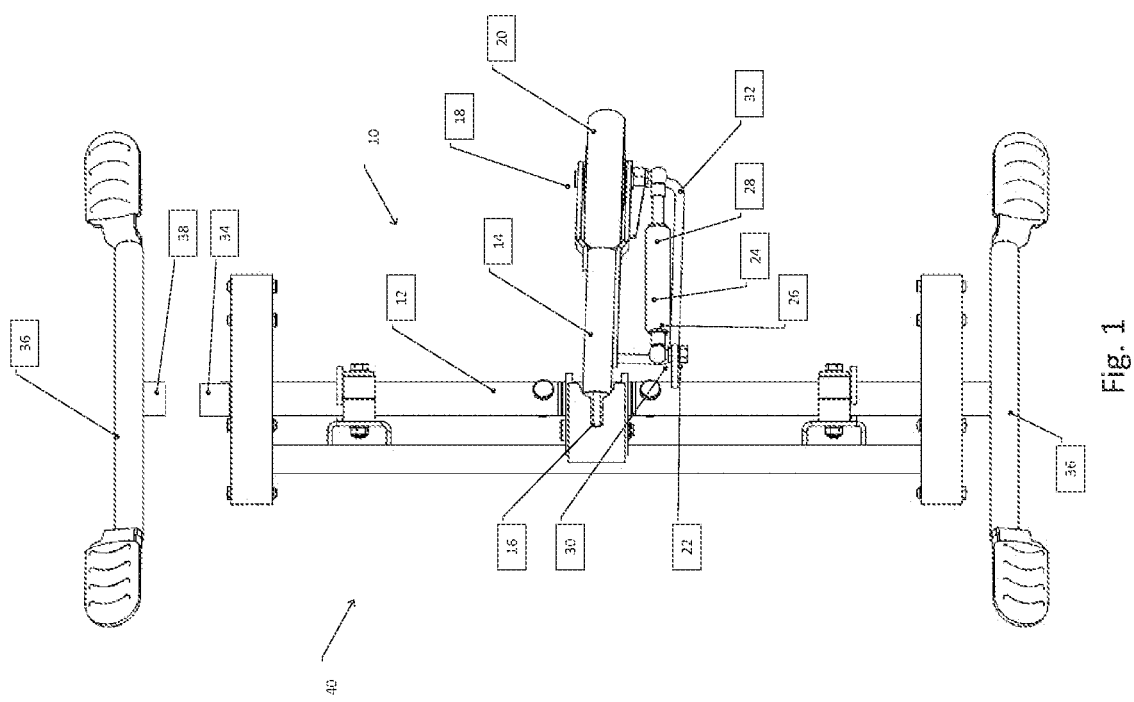
FIG. 1 shows a top view of a retractable wheel system according to one aspect of the present disclosure.

For purposes of the description hereinafter, the terms "upper", "lower", "right", "left", "vertical", "horizontal", "top", "bottom", "lateral", "longitudinal", and derivatives thereof, shall relate to the invention as it is oriented in the figures. However, it is to be understood that the invention may assume alternative variations and step sequences, except where expressly specified to the contrary. It is also to be understood that the specific systems and processes illustrated in the attached drawings, and described in the following specification, are simply exemplary examples of the invention. Hence, specific dimensions and other physical characteristics related to the examples disclosed herein are not to be considered as limiting.

In an exemplary embodiment, the retractable wheel system 10 may include a rotatable or pivotable member 12, a swing arm 14 extending from the pivotable member 12, a retractable wheel 20 extending from a distal end of swing arm 14, a pivoting swing mount 22 and spring member 24 operatively associated with retractable wheel 20. Optionally, retractable wheel system 10 may further include an actuator, such as foot pedal assembly, and/or a mounting unit 40. In an exemplary embodiment, retractable wheel system 10 may be configured as a $5^{th}$ wheel assembly for a transportation unit 70, such as a patient handling system. Exemplary patient handling systems may include beds, trolleys and/or patient lifts. In one embodiment, retractable wheel system 10 may be part of and/or otherwise integrally formed with a patient handling system. Alternatively, retractable wheel system 10 may be removably attached to a patient handling system via a mounting unit 40 so as to allow for quick and easy installation of a $5^{th}$ wheel assembly to facilitate maneuvering of the patient handling system.

Referring to FIG. 1, a non-limiting exemplary embodiment of a retractable wheel system 10 is shown. The retractable wheel system 10 may include a rotatable or pivotable member 12, such as a bar or rod. The retractable wheel system 10 may also include a swing arm 14 having a first end 16 and a second end 18. The first end 16 of the swing arm 14 may be attached to and extend from the rotatable member 12. The second end 18 of the swing arm 14 may be attached to a retractable wheel 20. The retractable wheel 20 may be rotatably attached to and extend from the second end 18 of the swing arm 14 so that it can rotate when in contact with the ground. The swing arm 14 may rotate upon rotation of the rotatable member 12 such that the retractable wheel 20 is either raised from or lowered to a ground surface. The retractable wheel 20 may be a powered wheel rotated by a motor or may be a manually rotatable wheel.

With continued reference to FIG. 1, the retractable wheel system 10 further includes a swing mount 22 attached to the rotatable member 12. In some non-limiting embodiments, the swing mount 22 may be attached to the rotatable member 12 by welding. In some non-limiting embodiments, the swing mount 22 may be rotatably attached to the rotatable member 12, relative to the rotatable member 12, such as by being rotatably bolted to the rotatable member 12. A spring member 24 may include a first end 26 and a second end 28. The first end 26 of the spring member 24 may be attached to the swing mount 22 at a connection point 30. The spring member 24 may be attached at the connection point 30 by any suitable fastener, and in some non-limiting embodiments, the fastener may permit rotation of the spring member 24 relative to the swing mount 22 at the connection point 30. In one non-limiting embodiment, the spring member 24 includes a member that may be inserted through a connection hole 42 at the connection point 30 and a washer may be rotatably fixed to the member such that the spring member 24 may be rotatable relative to the spring mount 22 at the connection point 30 (see FIG. 2, for example). The second end 28 of the spring member 24 may be attached to the second end 18 of the swing arm 14. Thus, the spring member 24 may be attached to the swing arm 14 proximate the retractable wheel 20. The retractable wheel system 10 may also include a protective bar 32 attached to the swing mount 22. The protective bar 32 may be positioned proximate the spring member 24 to protect the spring member 24 from being contacted by objects near the retractable wheel system 10.

With continued reference to FIG. 1, retractable wheel system 10 may include an actuator for inducing movement of rotatable member 12, swing mount 22, swing arm 14 and retractable wheel 20, specifically raising and lowering of retractable wheel 20. In one embodiment, the actuator may be configured as a foot pedal assembly, wherein the retractable wheel system 10 may include receiving holes 34 at the ends of the rotatable member 12. The receiving holes 34 may receive rotatable pedals 36 having axles 38. Thus, the rotatable pedals 36 may be positioned at the ends of the rotatable member 12 by inserting the axles 38 into the receiving holes 34. However, it will be appreciated that the rotatable pedals 36 may be attached by any means to the rotatable member 12 such that rotation of the rotatable pedals 36 effects rotation of the rotatable member 12 and vice versa. The rotatable pedal 36 may be any sort of pedal, such as a foot-activated pedal. In one non-limiting embodiment, the rotatable pedal 36 may be a foot pedal that rotates when stepped on by a foot, such that the foot, by rotating the rotatable pedal 36, rotates the rotatable member 12.

With continued reference to FIG. 1, the retractable wheel system 10 may be included in, form part of or may be attachable to a transportation unit 70, such as but not limited to a patient handling system. In one embodiment, retractable wheel system 10 may be removably attached to the transportation unit 70 via a mounting unit 40. The retractable wheel system 10 may be included to enhance steering of the transportation unit 70 such that the transportation unit 70 may be more maneuverable. The transportation unit 70 may be any unit that transports a load that includes wheels for rolling the load. In one non-limiting embodiment, the transportation unit 70 may be a medical bed, a patient lift, a wheelchair, and the like.

Figure 2:
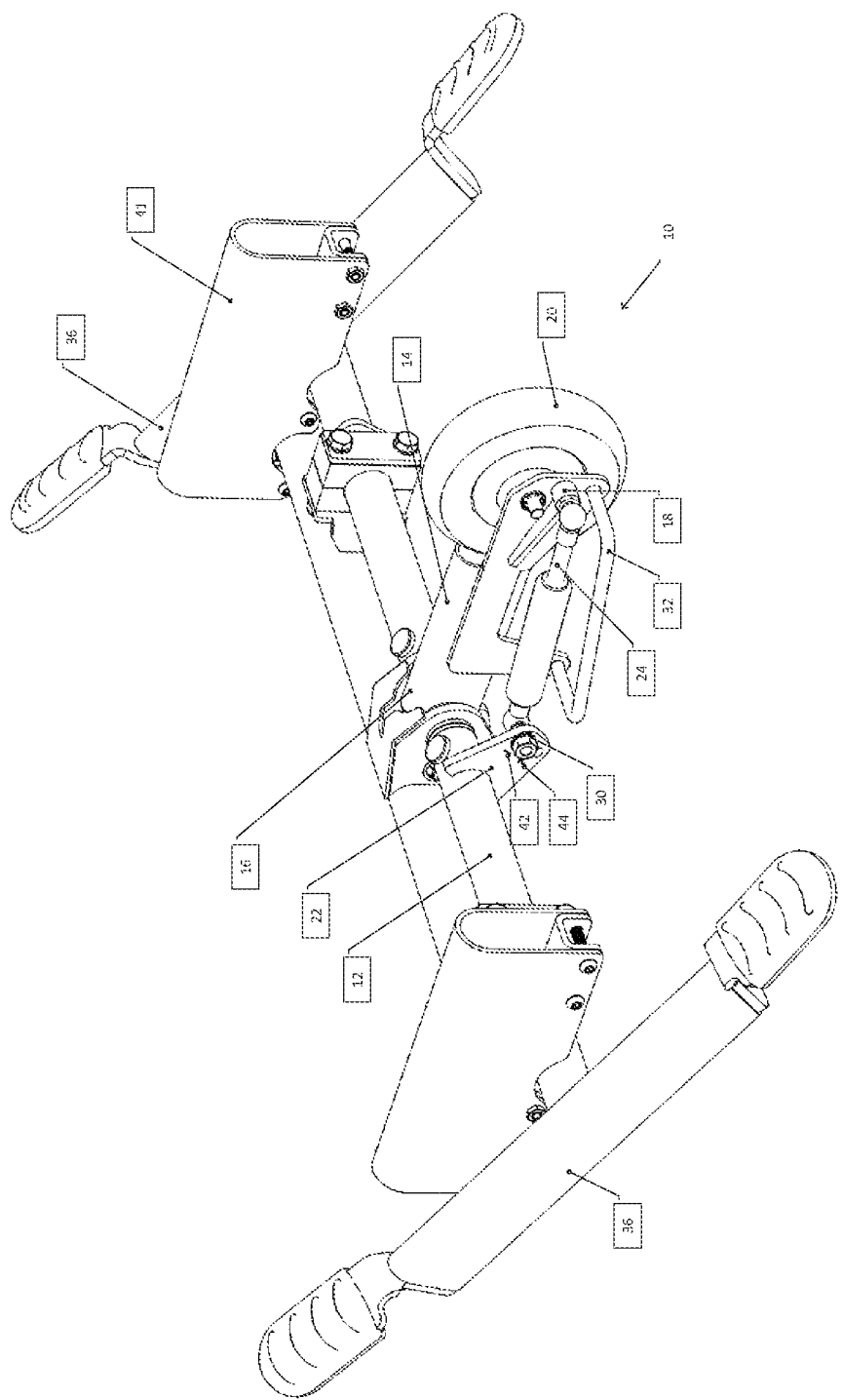
FIG. 2 shows a perspective view of a retractable wheel system according to one aspect of the present disclosure co-acting with a rotatable pedal to rotate a rotatable member.
Figure 3:
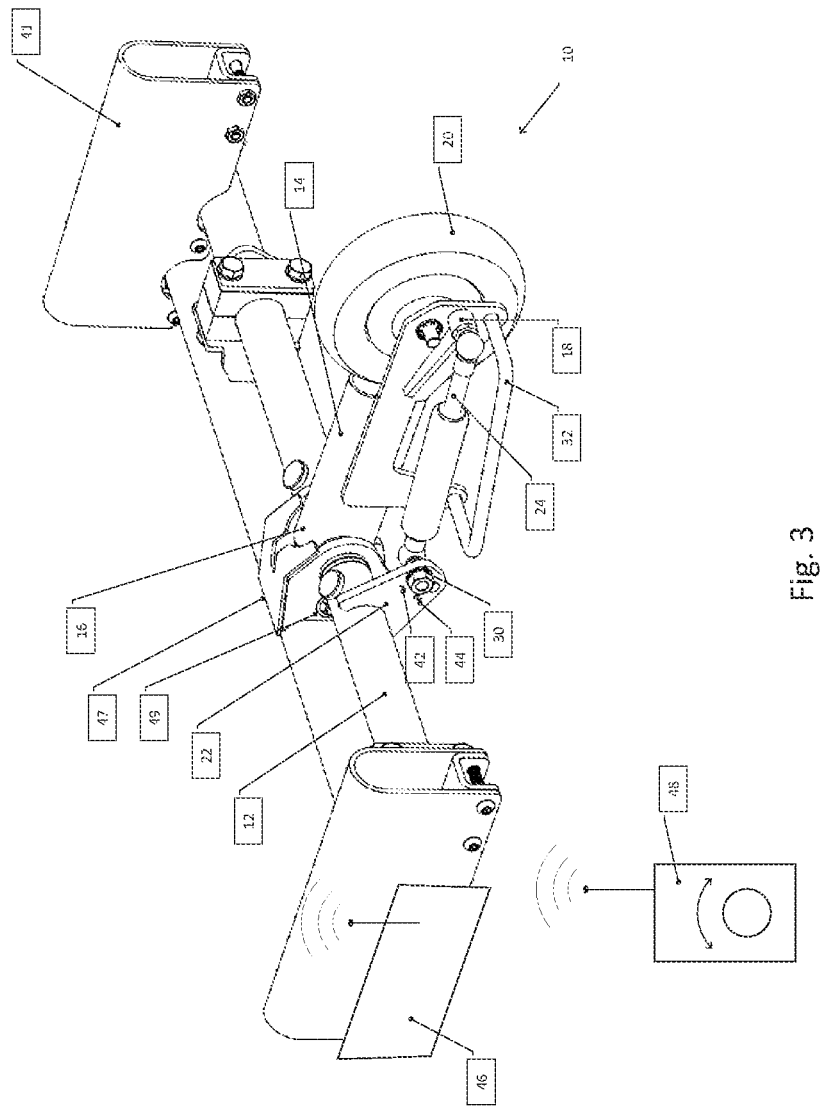
FIG. 3 shows a perspective view of a retractable wheel system according to one aspect of the present disclosure co-acting with a motor to rotate a rotatable member.

Referring to FIGS. 2 and 3, the rotatable member 12 may be rotated by any suitable arrangement. In one non-limiting embodiment, the rotatable member 12 may be rotated manually. For example, the rotatable pedal 36 may be rotated to effect rotation of the rotatable member 12 (see FIG. 2). In this non-limiting embodiment, depressing the higher end of the rotatable pedal 36 (by a user) may rotate the rotatable pedal 36, which, in effect, causes the rotation of the rotatable member 12. In another non-limiting embodiment, the rotatable member 12 may be rotated automatically, and retractable wheel system 10 may have a motorized or motor assisted actuator. For example, a motor 46 may co-act with the rotatable member 12 to effect rotation of the rotatable member 12 (see FIG. 3). The motor 46 may be attached at the end of the rotatable member 12, and activation of the motor 46 may rotate the rotatable member 12. A controller 48 may be included to communicate with the motor 46. The controller 48 may cause the motor 46 to rotate the rotatable member 12 one direction or the other based on a user using the controller 48. The controller 48 may be operatively connected to the motor 46 via a wired or wireless connection. It will be appreciated that any other arrangement may be used to effect rotation of the rotatable member 12 upon user action.

With continued reference to FIGS. 2 and 3, the swing mount 22 may include at least one connection hole 42. The connection hole 42 may be positioned in the swing mount 22 and the spring member 24 may be rotatably attached to the swing mount 22 through the connection hole 42 (at the connection point 30). More than one connection hole (a first connection hole 42 and a second connection hole 44) may be provided so that the spring member 24 may be attached to the swing mount 22 at different points to make the swing mount 22 adjustable. The connection hole 42, 44 may be selected for use as the connection point 30 based on the dimensions of components in the retractable wheel system 10 or the transportation unit 70, such as the size of the casters. For example, the first connection hole 42 may be used as the connection point 30 with four inch casters, while the second connection hole 44 may be used as the connection point 30 with five inch castors.

Figure 4A:
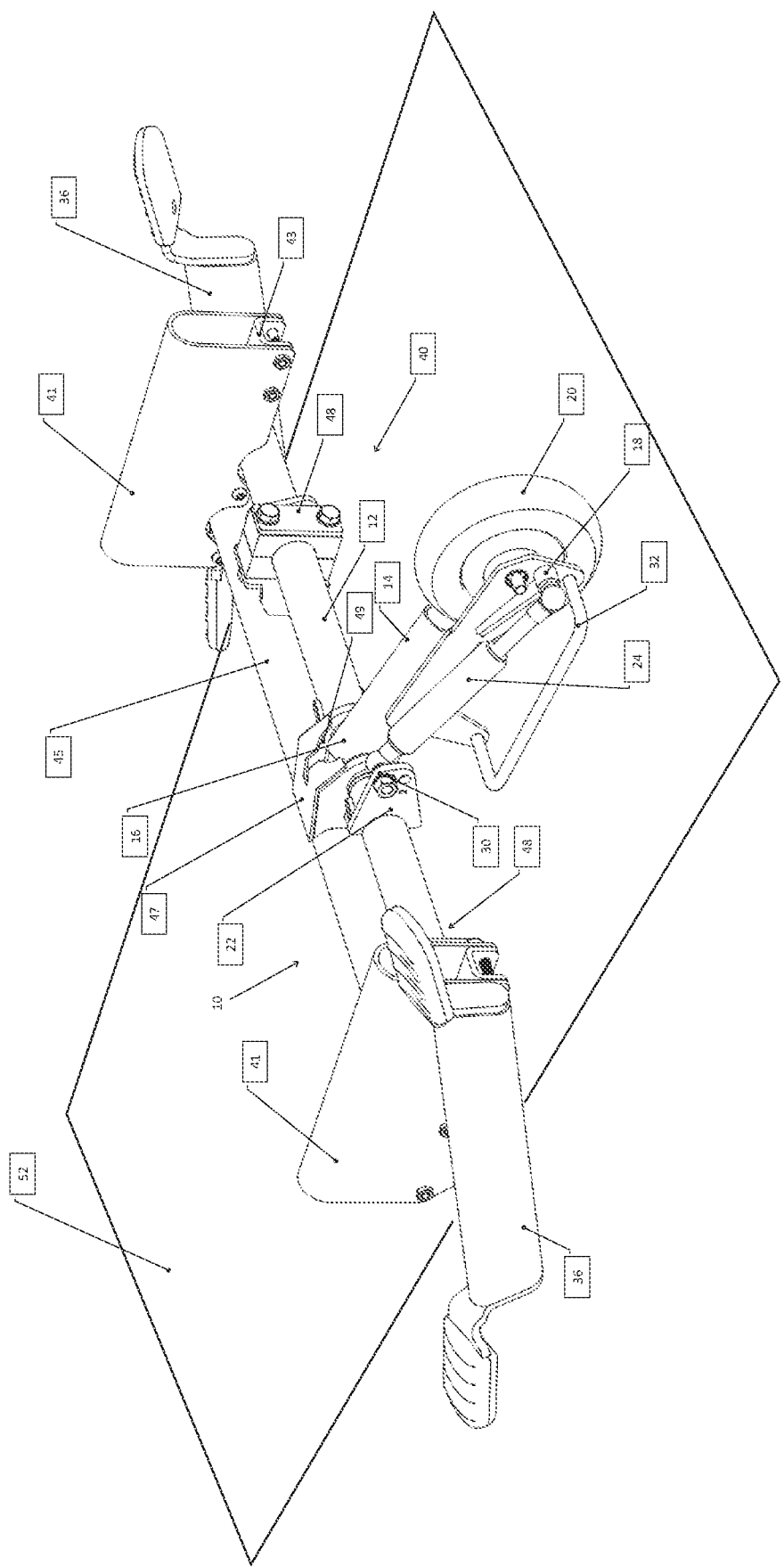
FIG. 4A shows a perspective view of a retractable wheel system according to one aspect of the present disclosure in a down position.
Figure 4B:
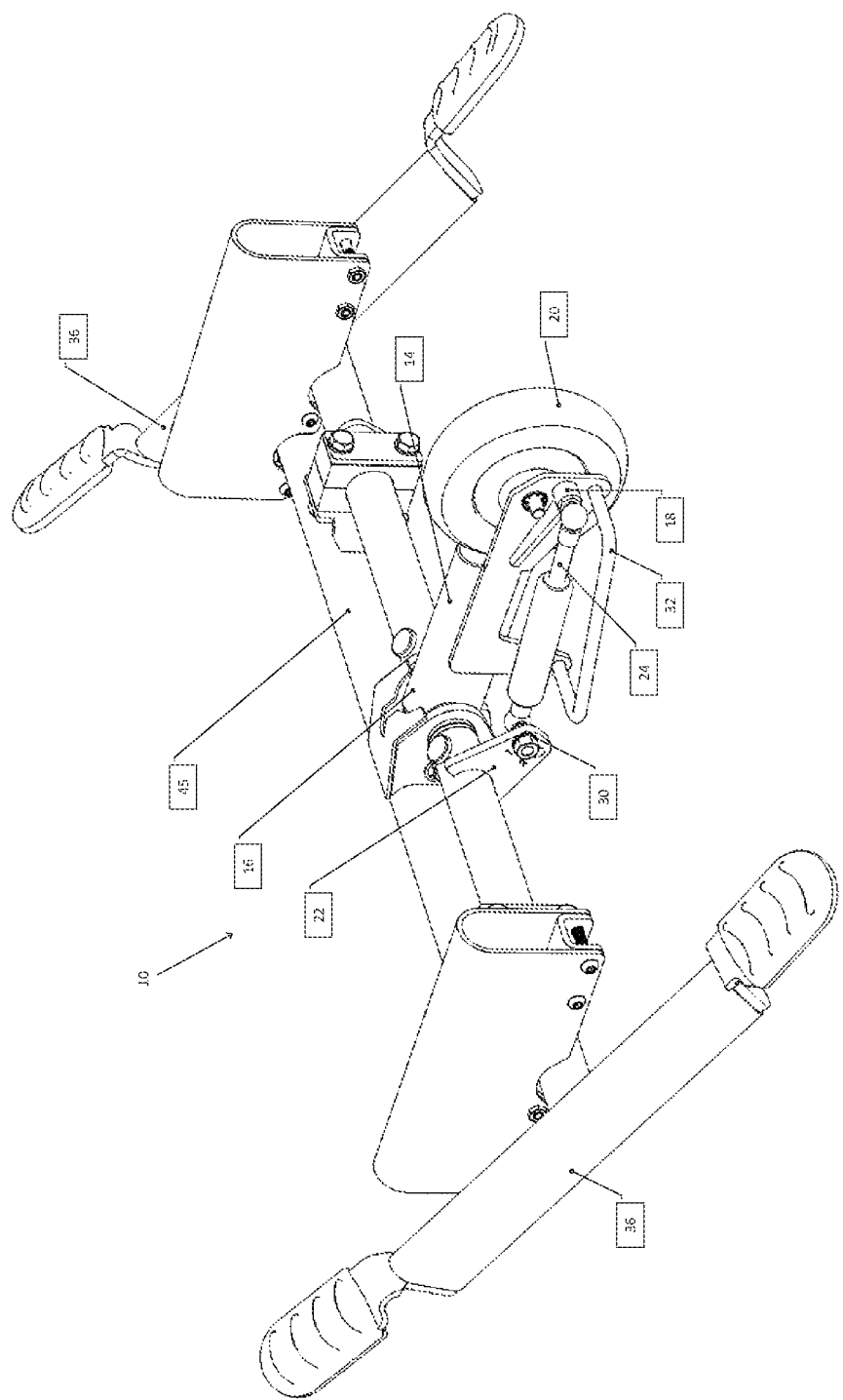
FIG. 4B shows a perspective view of a retractable wheel system of FIG. 4A in an up position.

Referring to FIGS. 4A and 4B, the retractable wheel system 10 may include a plurality of positions. In a first, extended position (hereinafter "down position"), the retractable wheel 20 may be extended down toward the ground such that the retractable wheel 20 may be in contact with the ground (see FIG. 4A). In such a configuration, the connection point 30 is above a line 50 (see FIG. 5A, for example as described below). The swing arm 14 may be angled relative to the ground in the down position, and the retractable wheel 20 is configured to roll on the ground in the down position. In a second, refracted position (hereinafter "up position"), the retractable wheel 20 may be retracted up away from the ground such that the retractable wheel 20 may not be in contact with the ground (see FIG. 4B). The connection point 30 may be above the line 50 (see FIG. 5C, for example described below). In the up position, the retractable wheel 20 may be off the ground, and the swing arm 14 may be substantially parallel with the ground.

Referring to FIGS. 5A-5C, transition of the retractable wheel system 10 between the up and down positions is shown is dependent upon the relative position of a line 50 and connection point 30 discussed below. In FIG. 5A, the retractable wheel system 10 is in its down position so that the retractable wheel 20 may be touching the ground and can roll along the ground. In the down position, the connection point 30 may be above a center 50. The line 50 is an imaginary linear line that extends between a wheel attachment point (e.g. a point of attachment between swing arm 14 and retractable wheel 20) and an opposite swing arm rotation point (e.g. a pivotable point and/or pivotable point of attachment between swing arm 14 first end 26 and anchoring surface) of the swing arm 14. In the embodiment shown in FIGS. 5A-5C, the swing arm rotation point coincides with the axis of rotation of rotatable member 12, and line 50 forms a center axial line through a length of swing arm 14, e.g. a centerline as shown in FIGS. 5A-5C. In another embodiment, the swing arm rotation point need not coincide with the axis of rotation of rotatable member 12 and/or line 50 need not extend through a center axial line of swing arm 14. Spring member 24 applies a consistent force against retractable wheel 20, F1. When the connection point 30 is above the line 50 (see FIG. 5A), the spring member 24 applies a force with a downward directional vector inducing lowering of wheel 20 so that it is biased against the ground, as shown by arrow $D_1$ (towards the retractable wheel 20 and the ground). This force keeps the retractable wheel 20 in contact with the ground so that it can roll relative to the ground and keeps the retractable wheel system 10 in the down position. As the retractable wheel 20 rolls along the ground, the spring member 24 may move up or down so that the retractable wheel 20 may roll over uneven surfaces of the ground (e.g., act as a suspension for the retractable wheel). For example, when going over a bump in the ground, the spring member 24 may move up toward the rotatable member 12 to allow the retractable wheel 20 to go over the top of the bump and then move back down to its original position when the retractable wheel 20 descends from the bump and back onto level ground. When the connection point 30 is below the line 50 (see FIGS. 5B and 5C), the spring member 24 applies a force with an upwards directional vector inducing the raising of wheel 20, as shown by arrow $D_2$ (up and away from the ground). This force pushes the retractable wheel 20 off of the ground and keeps the retractable wheel system 10 in the up position. FIG. 5B shows the connection point 30 below the line 50 so that the retractable wheel system 10 can move from the down position to the up position. In FIG. 5B, the retractable wheel system 10 is in the process of moving from the down position to the up position (e.g., the swing arm 14 is swinging from the position in FIG. 5A to the position in FIG. 5C). In FIG. 5C, the connection point 30 is below line 50 such that the swing arm 14 has moved the retractable wheel system 10 to the up position, where it remains until the connection point 30 moves back above line 50 (e.g., by rotation of the rotatable member 12 and the swing mount 22).

In some non-limiting embodiments, the spring member 24 may be a gas spring. However, it will be appreciated that the spring member 24 may be any other type of spring device that exerts a force as described above (e.g., with the force direction based on the position of the connection point 30).

With continued reference to the exemplary embodiment of FIG. 5A-5C, the retractable wheel system 10 may be maintained in the up position and down position without the need for a locking mechanism, such as a mechanical or electromechanical lock. In other words, the retractable wheel system 10 may remain in the up position or down position depending on the position of the connection point 30 and does not include any further mechanism to hold the swing arm 14 in the up or down position. In this exemplary embodiment, the bidirectional spring biased system relies solely on the relative positioning of connection point 30 and line 50 to induce positioning of the retractable wheel 20 in a first raised upward position in which the wheel 20 does not engage the ground and is oriented substantially parallel to the rotatable member 20 and in a second lowered position, in which wheel 20 is biased to engage the ground. The direction of the force exerted by the spring member 24 may hold the retractable wheel system 10 in the up position or the down position. Therefore, the present retractable wheel system 10 simply and efficiently moves the swing arm 14 between the up position and the down position. In this retractable wheel system 10, only a single lever (e.g., the rotatable pedal 36) may be needed to move the retractable wheel system 10 between the down position and up position, as no secondary mechanical or electromechanical lock may be required to raise and lower the retractable wheel 20 and lock it in the desired position.

Referring back to FIGS. 4A-5C, the retractable wheel system 10 may be moved between the up position and the down position by rotating the rotatable member 12 and, in turn, the swing mount 22 accordingly. As previously described, the rotatable member 12 may be rotated using any suitable arrangement. In one non-limiting embodiment, shown in FIGS. 4A and 4B, the rotatable member 12 may be rotated using a rotatable pedal 36, such as a foot-activated pedal. Referring to FIGS. 4A and 5A, the retractable wheel system 10 may be positioned in the down position. In this down position, the rotatable pedal 36 may be up on one end and down on the other, and the retractable wheel 20 may be in contact with and able to be rolled along the ground. The connection point 30 may be above the line 50, and the spring member 24 may exert a force in the direction of arrow $F_1$ toward the retractable wheel 20 to maintain the retractable wheel system 10 in the down position.

The retractable wheel system 10 may be moved from the down position to the up position by a user stepping on the higher end of the rotatable pedal 36 (or otherwise depressing the higher end of the rotatable pedal 36). Stepping on the rotatable pedal 36 may switch the ends of the rotatable pedal 36 such that the opposite end is higher. Rotation of the rotatable pedal 36 may rotate the rotatable member 12. Rotation of the rotatable member 12 may rotate the attached swing mount 22. Rotation of the swing mount 22 may rotate the position of the connection point 30 (which is initially above the line 50), changing the position of the connection point 30 relative to the line 50 of the swing arm 14. It will be appreciated that rotation of the connection point 30 may rotate the spring member 24, which rotates relative to the connection point 30. Once the connection point 30 passes below the line 50, the force exerted by the spring member 24 changes directions so that the force may be exerted in a direction away from the ground, as shown by arrow $D_2$. The direction of the force from the spring member 24 may then lift the retractable wheel 20 off the ground and into the position in FIG. 5C, which is the up position. Therefore, rotation of the rotatable pedal 36 to rotate the rotational member 12, which ultimately reverses the force direction of the spring member 24 upon the connection point 30 passing below the line 50. This moves the retractable wheel system 10 from the down position to the up position.

Similarly, the retractable wheel system 10 may be moved from the up position to the down position. The retractable wheel system 10 may be moved from the up position to the down position by a user stepping on the higher end of the rotatable pedal 36. Rotation of the rotatable pedal 36 may rotate the rotatable member 12. Rotation of the rotatable member 12 may rotate the attached swing mount 22. Rotation of the swing mount 22 may rotate the position of the connection point 30 (which is initially below the line 50). Once the connection point 30 passes above the line 50, the force exerted by the spring member 24 changes direction so that the force may be exerted toward the ground, as shown by arrow $F_1$. The direction of the force from the spring member 24 may press the retractable wheel 20 onto the ground and into the position in FIG. 5A, which is the down position. Therefore, rotation of the rotatable pedal 36 ultimately reverses the force direction of the spring member 24 upon the connection point 30 passing above the line 50, which moves the retractable wheel system 10 from the up position to the down position.

Figure 13:
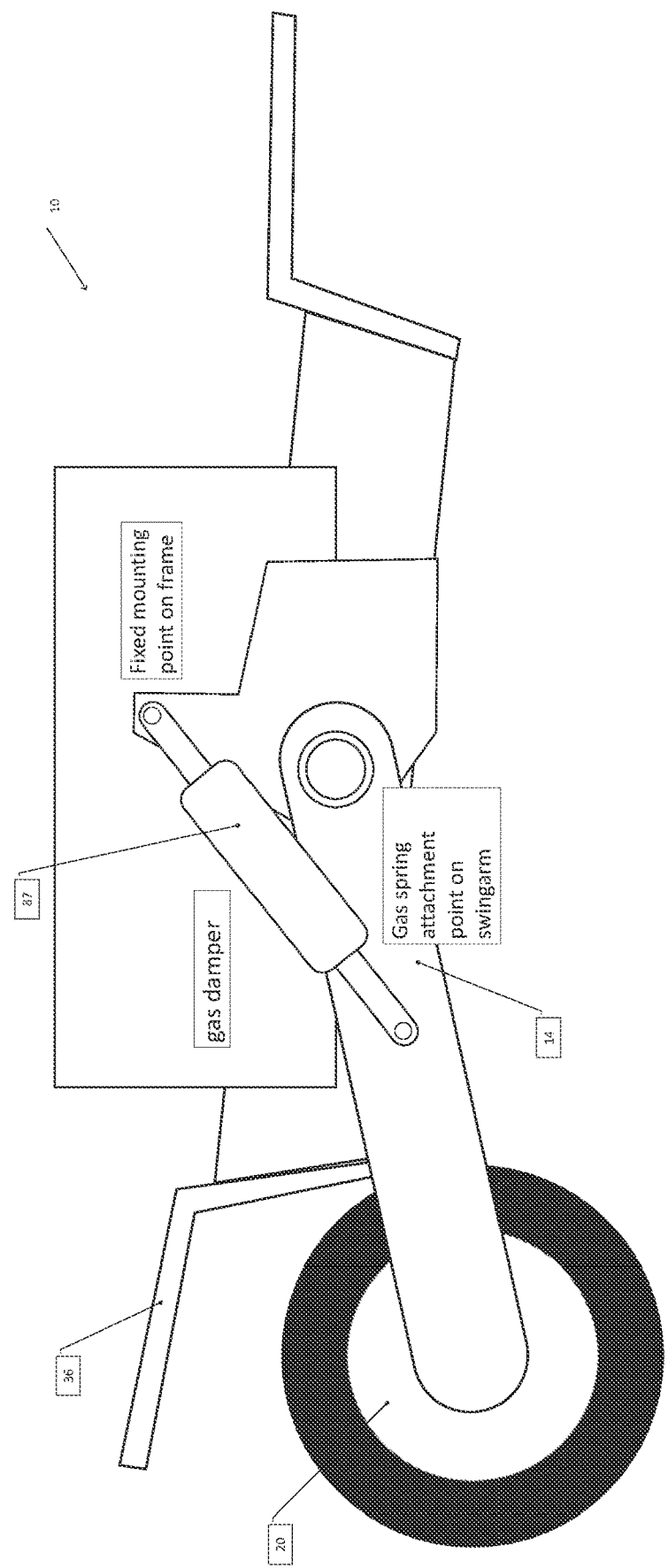
FIG. 13 shows a perspective view of a retractable wheel system including a gas damper according to one aspect of the present disclosure.
Figure 14:
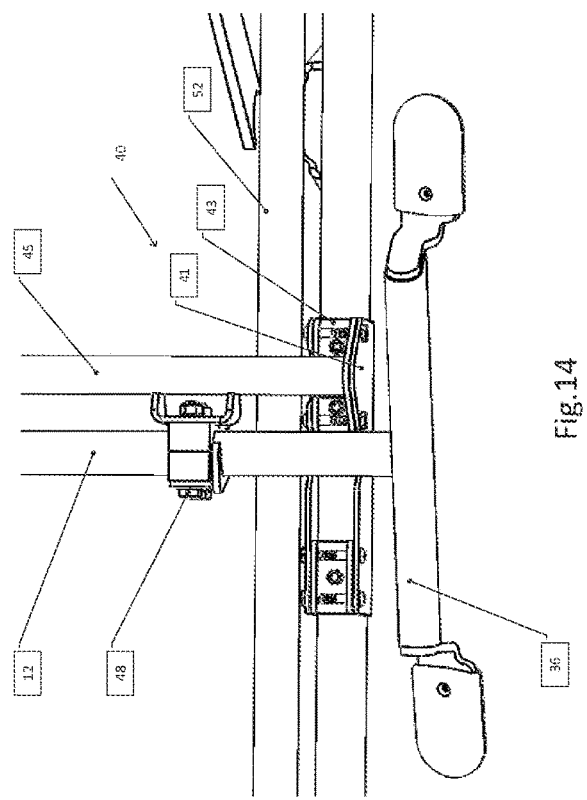
FIG. 14 shows a perspective view of a mounting unit for mounting a retractable wheel system according to one aspect of the present disclosure.
Figure 15:
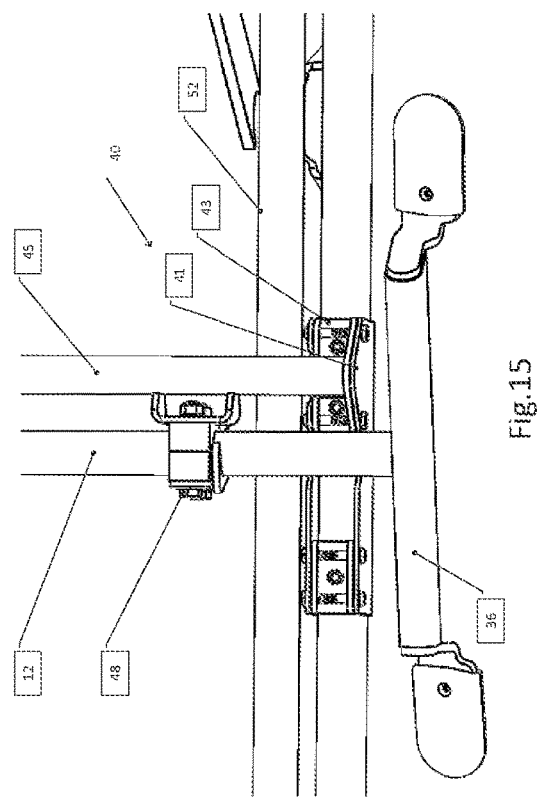
FIG. 15 shows another perspective view of the mounting unit of FIG. 14.
Figure 18:
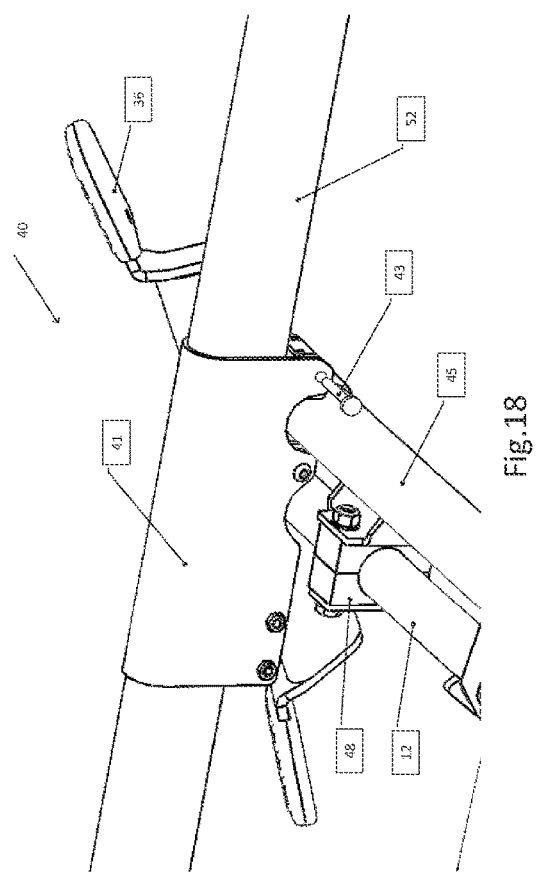
FIG. 18 shows another perspective view of the mounting unit of FIG. 14.
Figure 19:
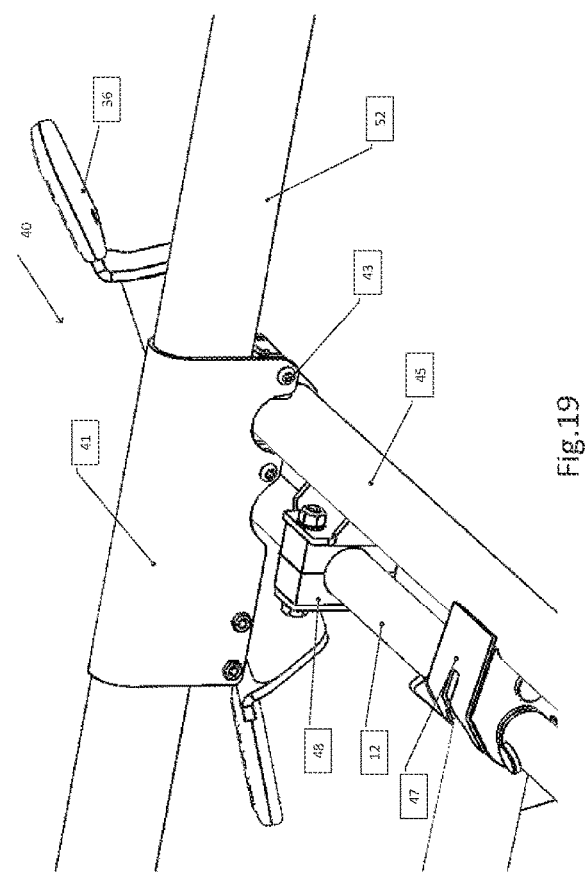
FIG. 19 shows another perspective view of the mounting unit of FIG. 14.
Figure 20:
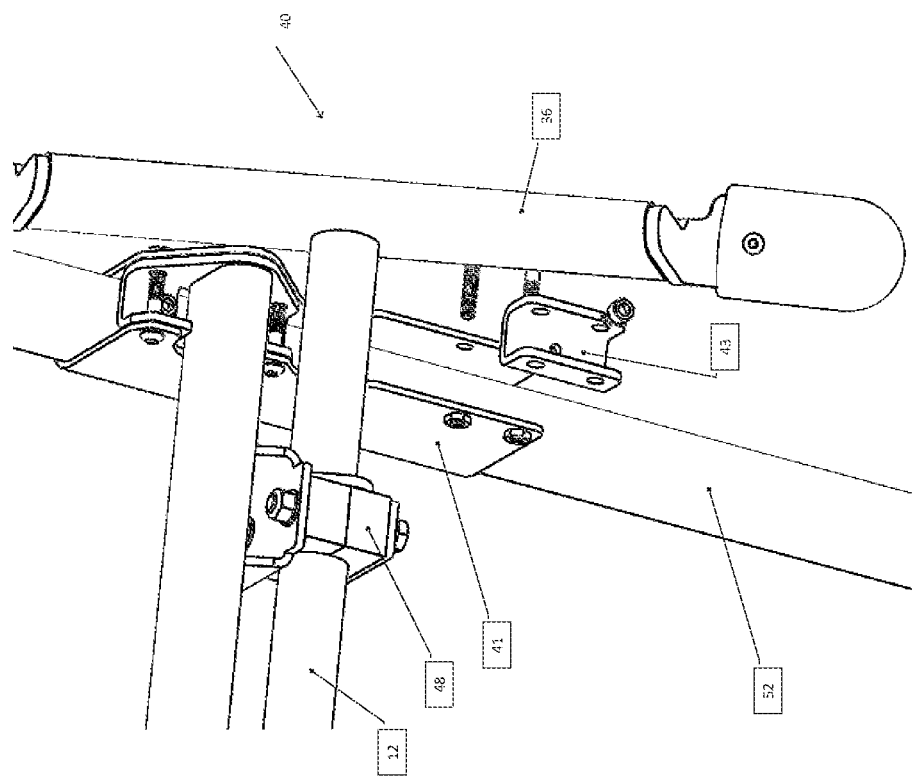
FIG. 20 shows another perspective view of the mounting unit of FIG. 14.
Figure 21:
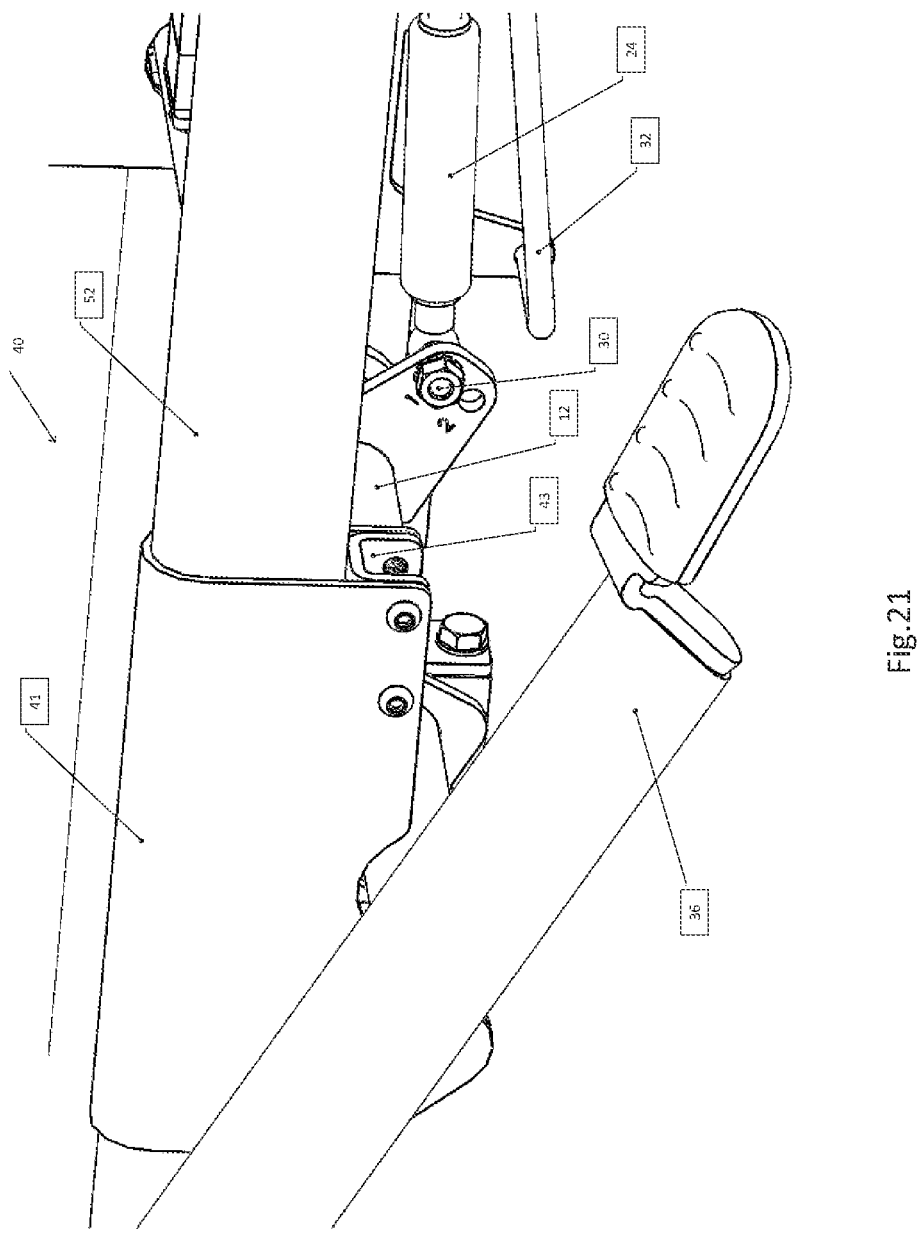
FIG. 21 shows another perspective view of the mounting unit of FIG. 14.
Figure 22:
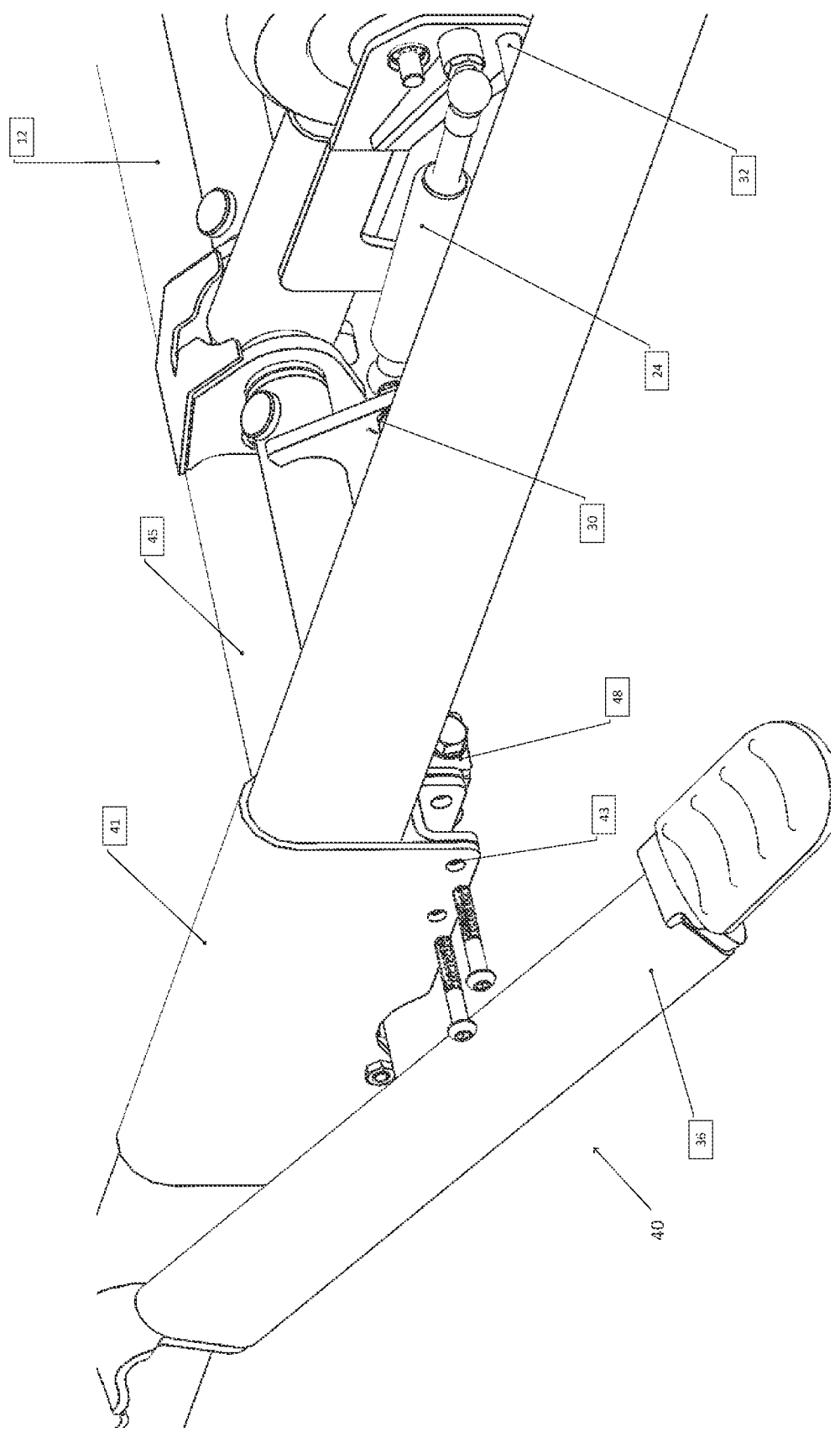
FIG. 22 shows another perspective view of the mounting unit of FIG. 14.
Figure 23:
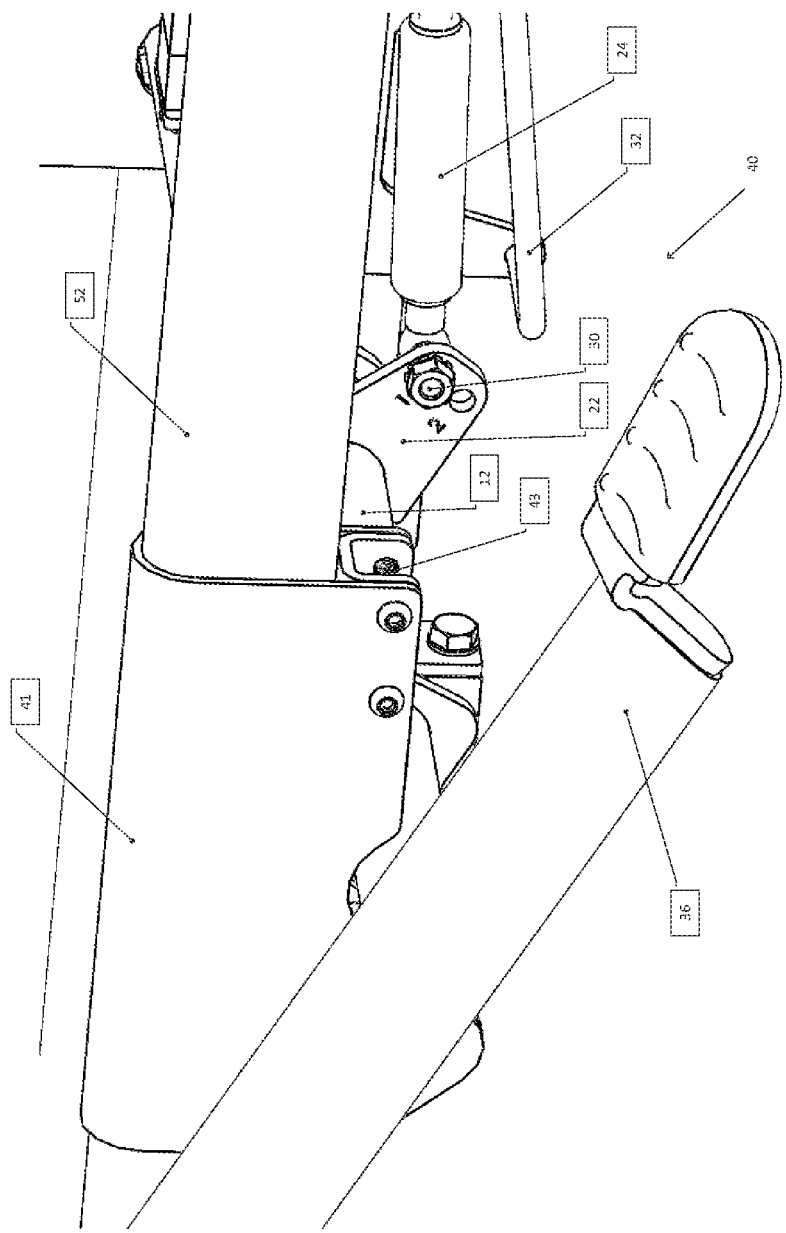
FIG. 23 shows another perspective view of the mounting unit of FIG. 14.
Figure 24:
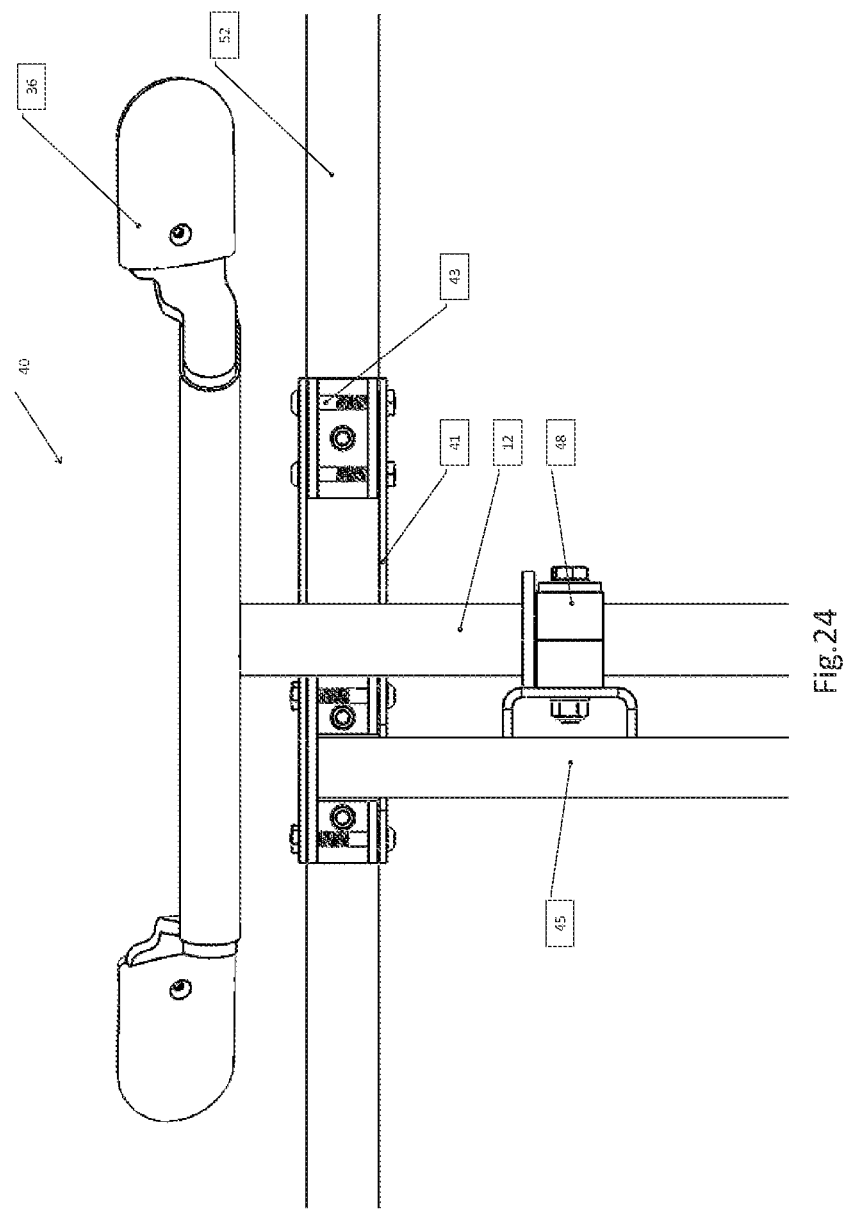
FIG. 24 shows another perspective view of the mounting unit of FIG. 14.
Figure 25:
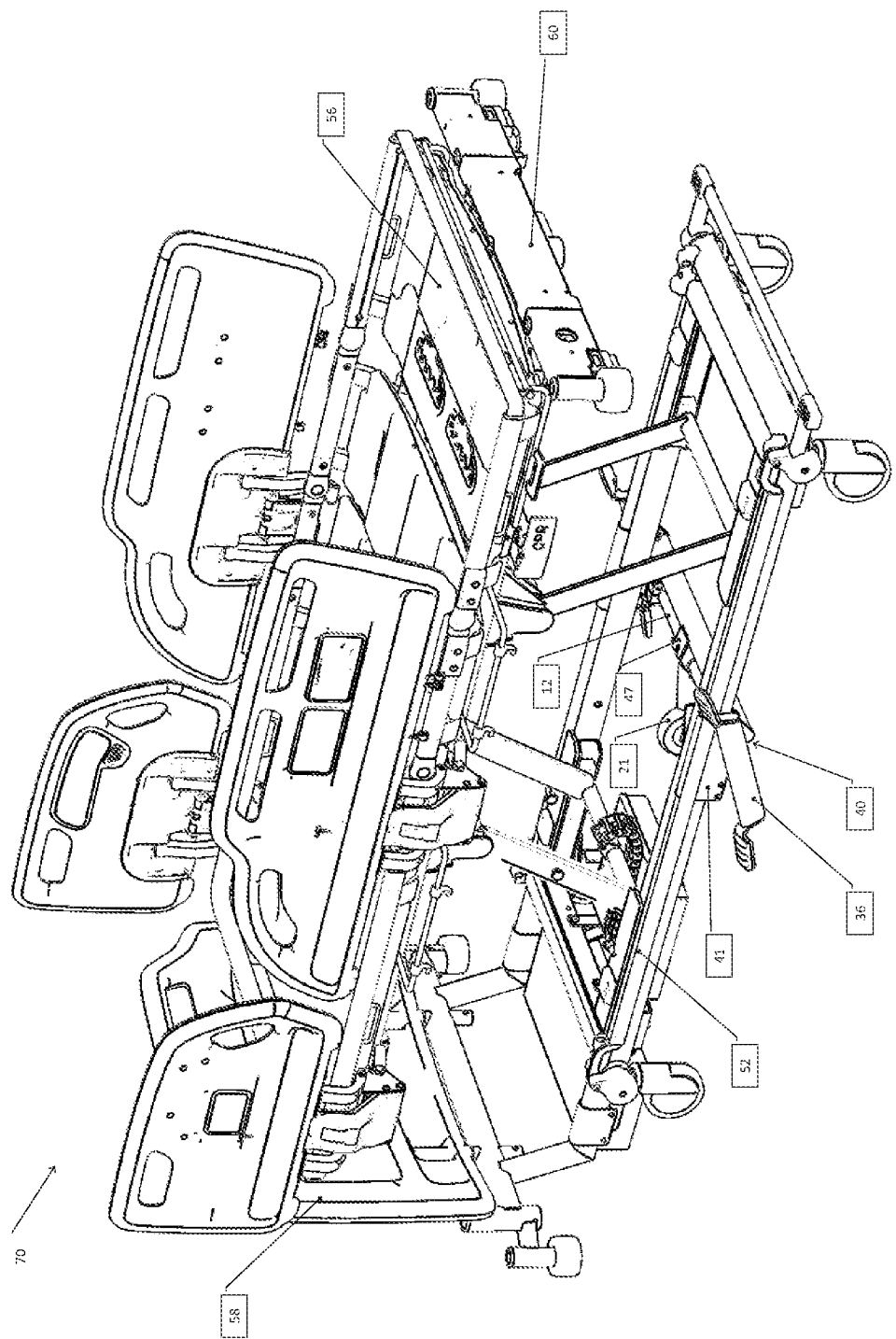
FIG. 25 shows a medical bed including a mounting unit to mount a retractable wheel system to the medical bed.
Figure 26:
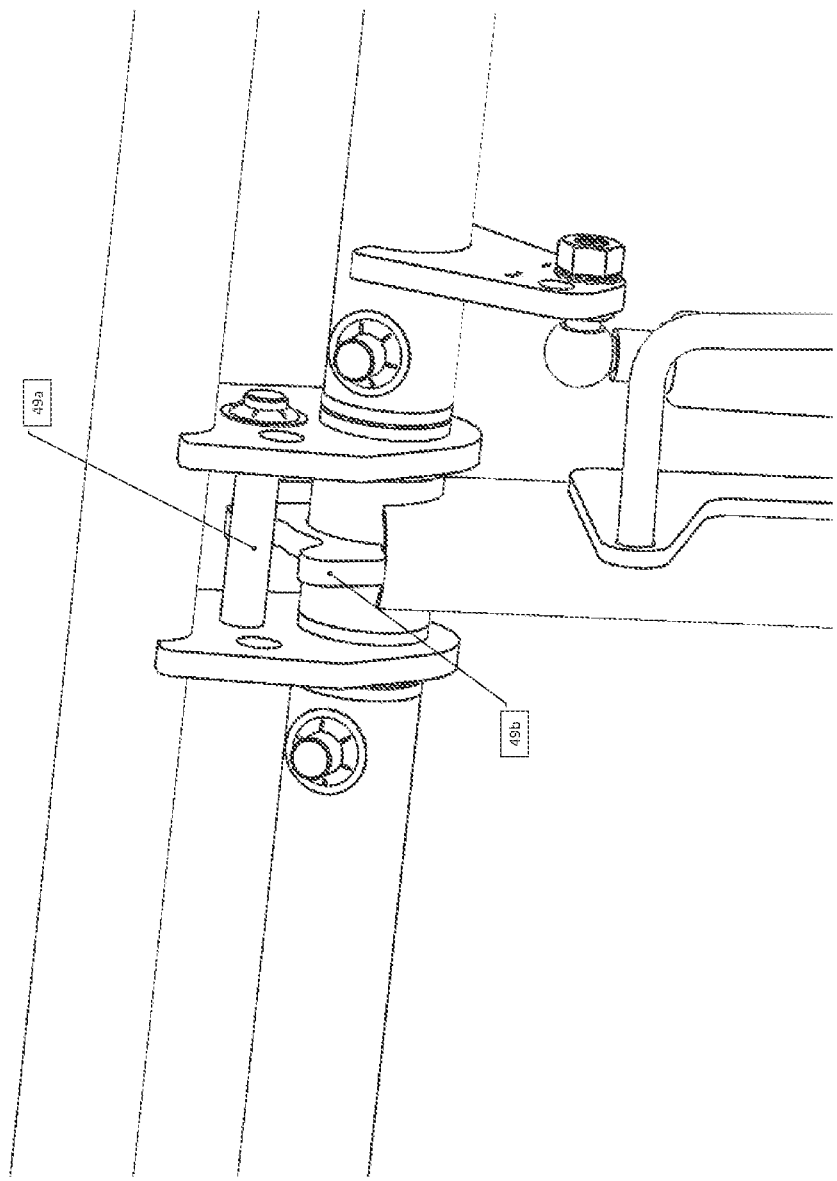
FIG. 26 shows another perspective view of the mounting unit of FIG. 14.

Optionally, retractable wheel system 10 may further include a dampener 87 that may dampen and decrease the rapid movement of the swing arm 14 between the up and down positions. As shown in FIG. 13, the gas damper 87 may be connected to a fixed mounting point (e.g. mounting frame support 45 described below) and one of the swing arm 14 and/or the retractable wheel 20.

Figure 6A:
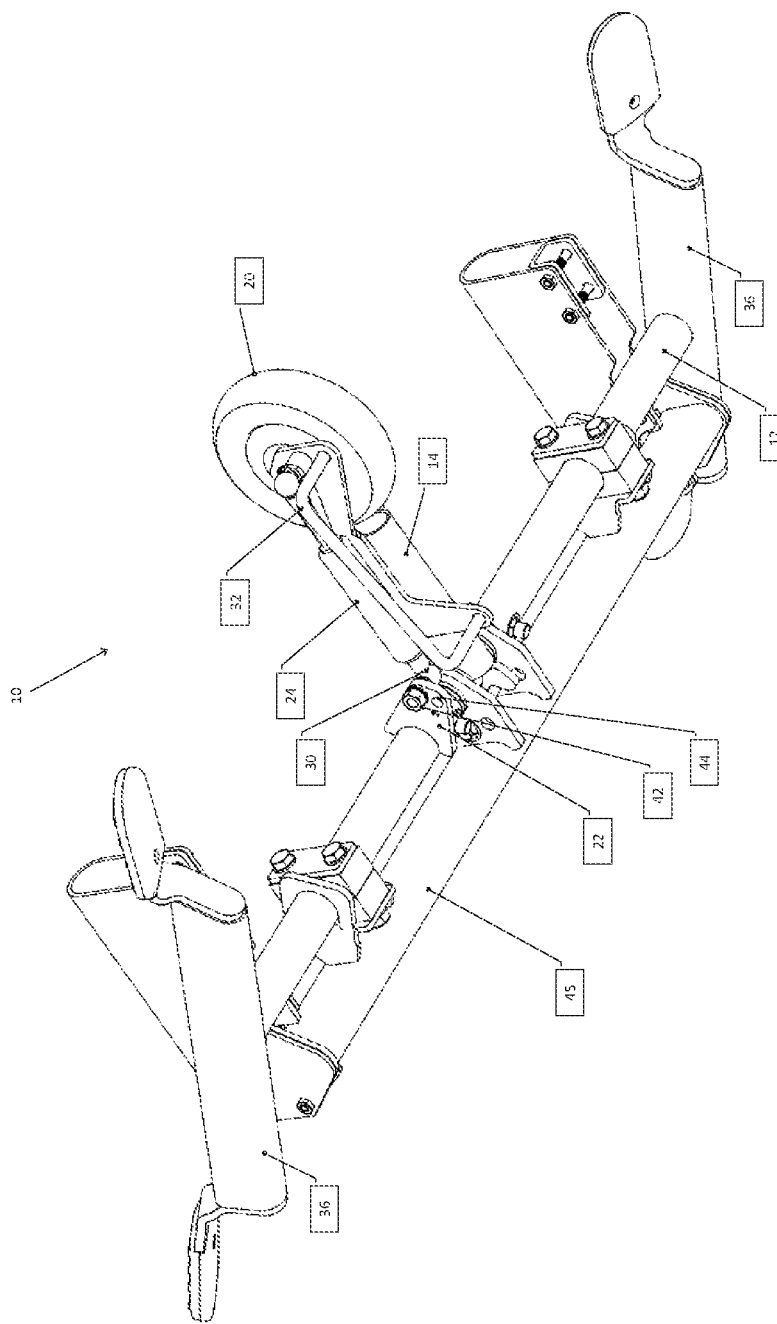
FIGS. 6A-6F show several views of a retractable wheel system according to various aspects of the present disclosure.
Figure 6B:
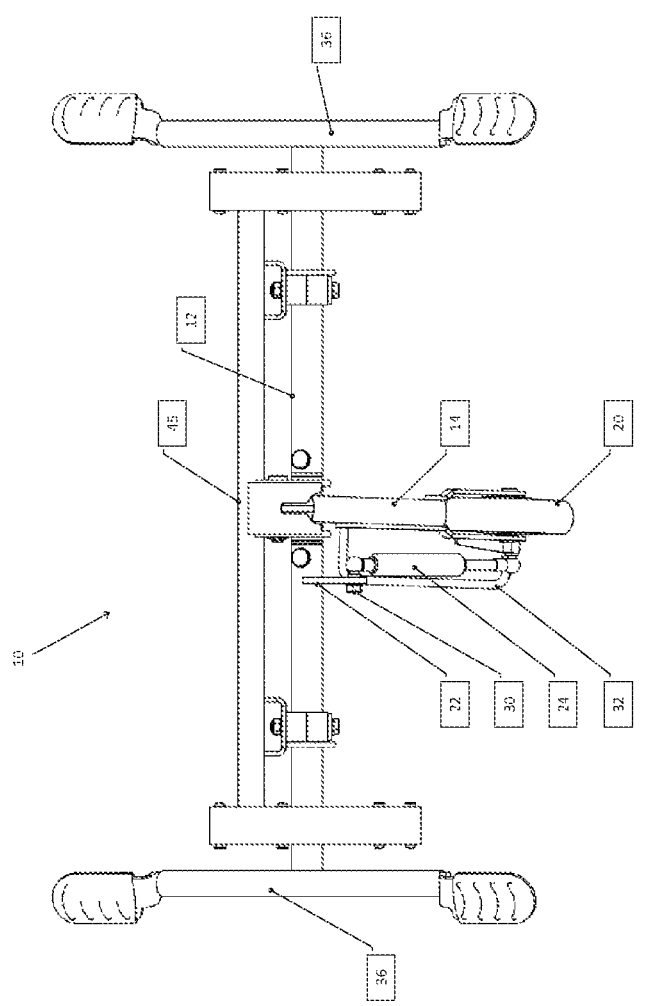
Figure 6C:
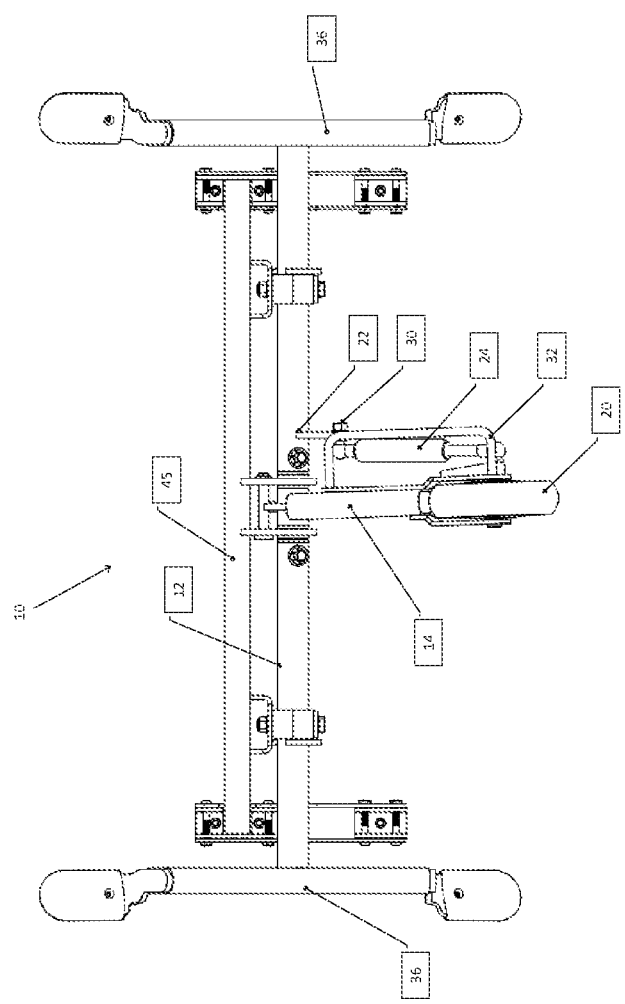
Figure 6D:
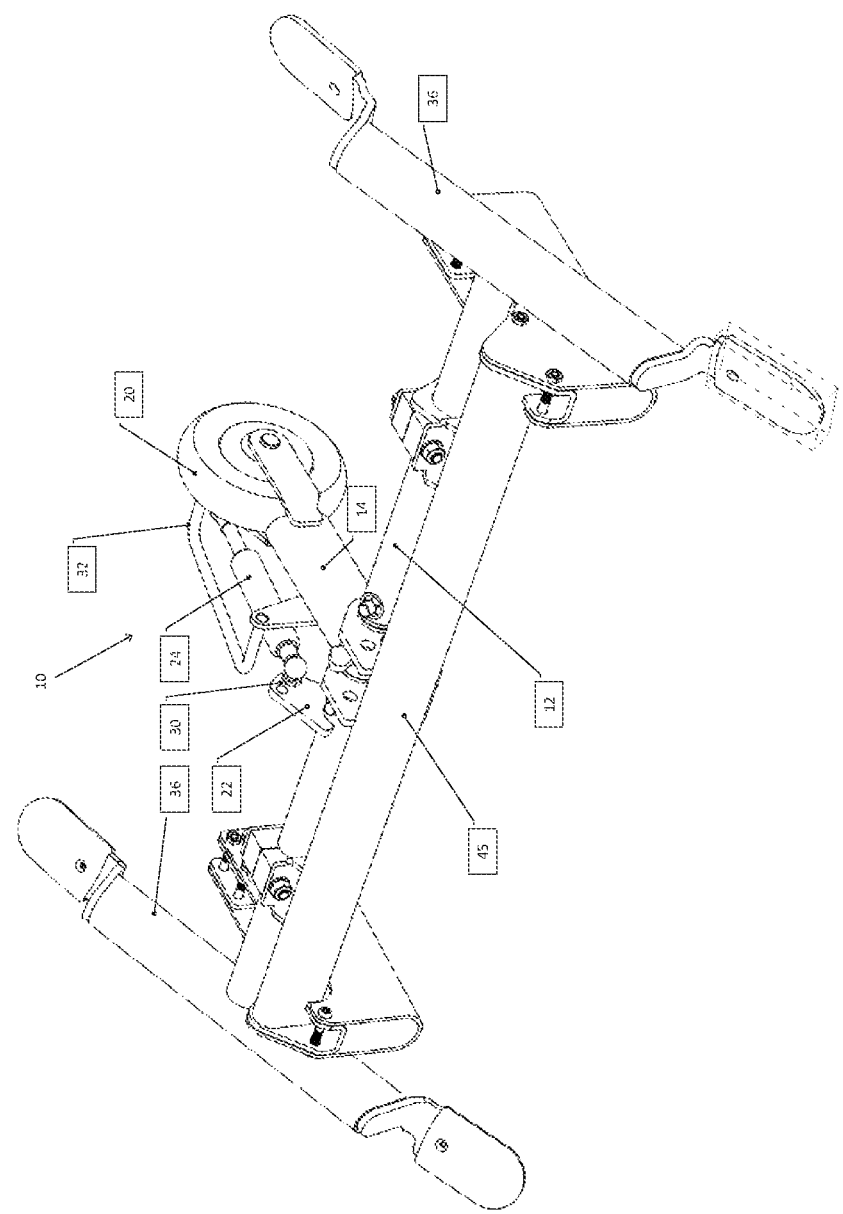
Figure 6E:
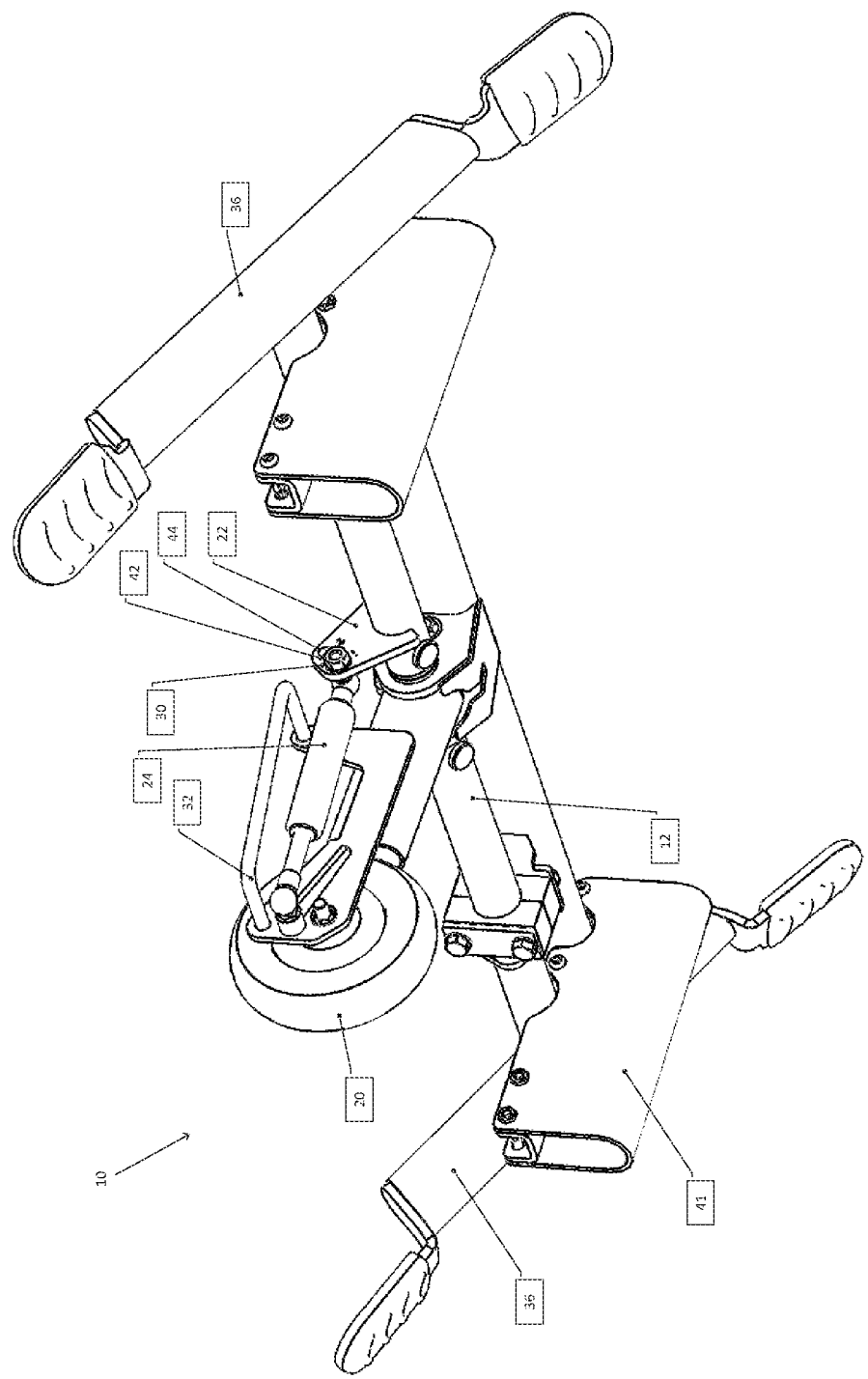
Figure 6F:
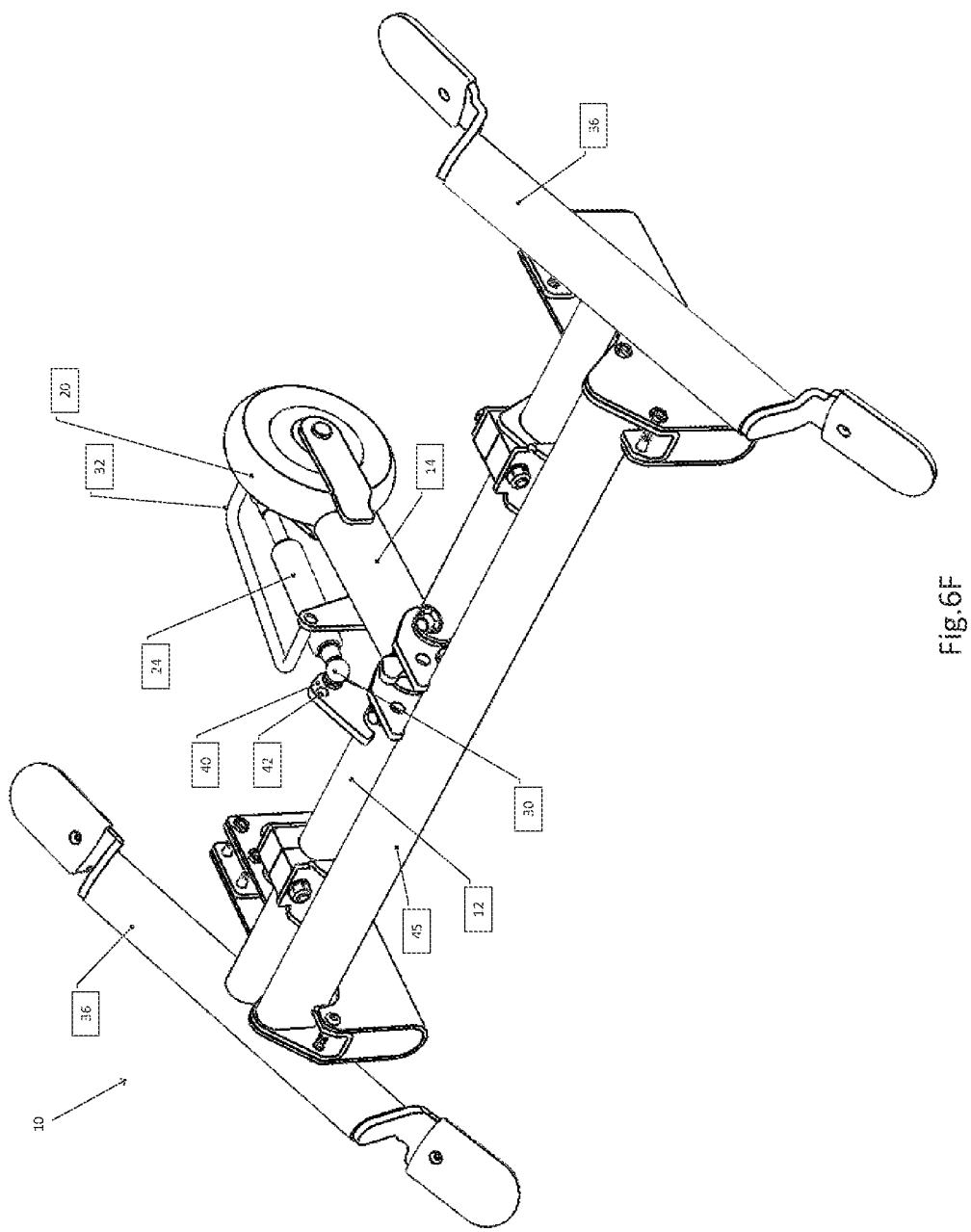

Referring to FIGS. 6A-6F, various views are shown of the retractable wheel system 10 which illustrate the retractable wheel system 10 from different angles. FIG. 6A shows a perspective view of the retractable wheel system 10. FIG. 6B shows a top view of the retractable wheel system 10. FIG. 6C shows a bottom view of the retractable wheel system 10. FIG. 6D shows another perspective view of the retractable wheel system 10. FIG. 6E shows another perspective view of the retractable wheel system 10. FIG. 6F shows another perspective view of the retractable wheel system 10.

Figure 7:
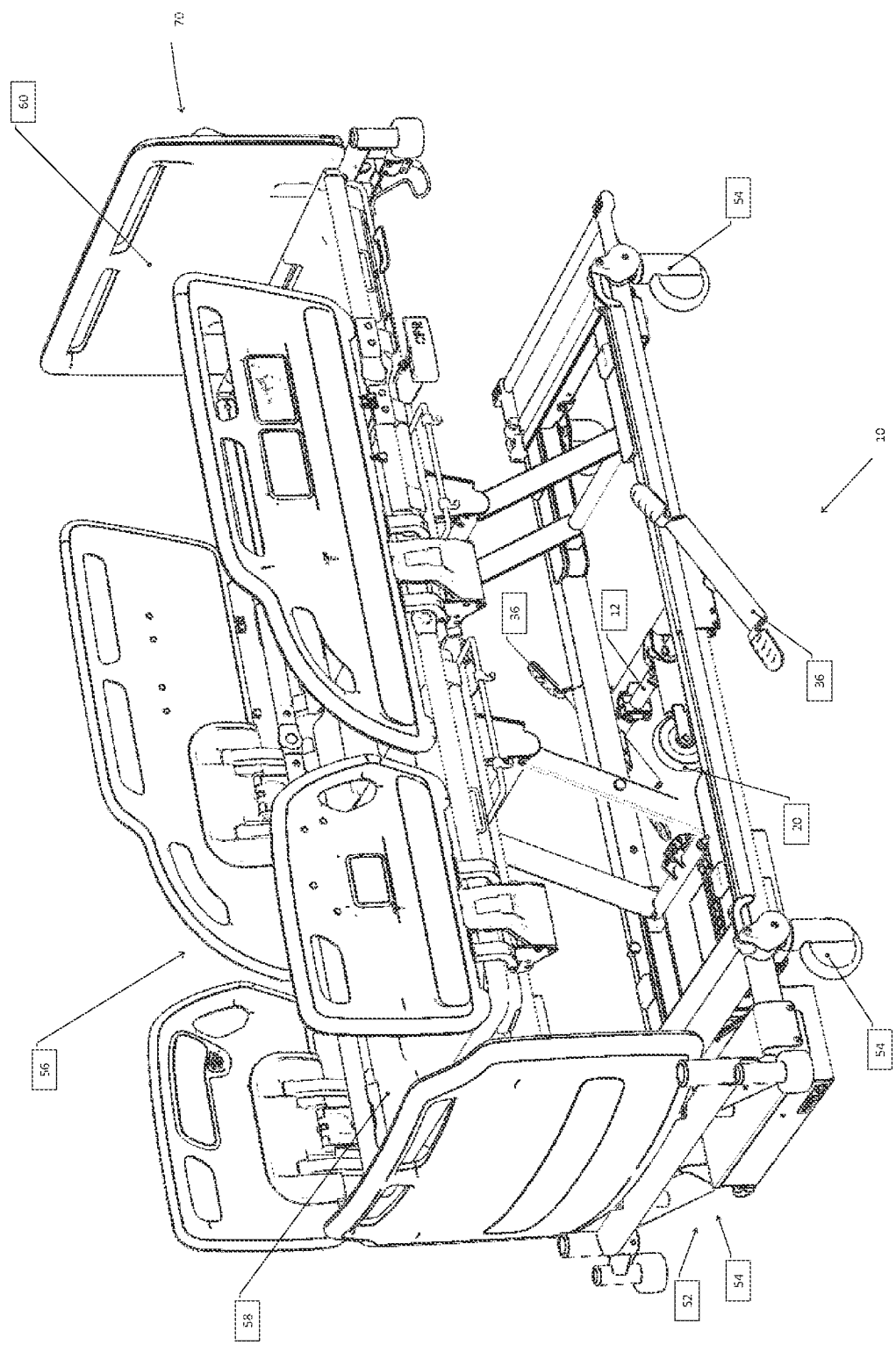
FIG. 7 shows a perspective view of a medical bed including a retractable wheel system according to one aspect of the present disclosure.

Referring to FIG. 7, a transportation unit 70 (hereinafter a medical bed 70) is shown that includes the retractable wheel system 10. The medical bed 70 may include a frame 52 attached to a plurality of wheels 54. The frame 52 may also be attached to a bed 56, which may be a flat surface to support a load, such as a patient. The medical bed 70 may include a foot end 58 and a head end 60. The foot 45 end 58 may be the end of the medical bed 70 at which a prostrate patient's feet may rest, and the head end 60 may be the end of the medical bed 70 at which the prostrate patient's head may rest. The medical bed 70 may be rolled and steered on the wheels 54 by pushing the medical bed 70 and may be used to transport a patient throughout the hospital.

The medical bed 70 may include a plurality of wheels 54, such as four wheels at the corners of the frame 52 of the medical bed 70. However, it will be appreciated that any number of wheels 54 may be included for desired steering and maneuverability of the medical bed 70. The medical bed 70 may include the retractable wheel system 10 as previously described, such that the retractable wheel 20 may be an additional wheel to the plurality of wheels 54. The retractable wheel system 10 may be attached to the frame 52 of the medical bed 70 by any suitable means, such as bolting the retractable wheel system 10 to the frame 52. For example, in a medical bed having four wheels 54, adding the retractable wheel system 10 makes the retractable wheel 20 the "fifth wheel" when in the down position. The retractable wheel 20 may be positioned between the plurality of wheels 54. In some non-limiting embodiments, the retractable wheel system 10 may be positioned so that the retractable wheel 20 is positioned in the center of the medical bed 70 between the plurality of wheels 54 (e.g., centered lengthwise and/or widthwise). In other non-limiting embodiments, the retractable wheel system 10 may be positioned so that the retractable wheel 20 is positioned to improve maneuverability and steering of the medical bed 70 compared to a medical bed 70 not having a retractable wheel 20. In an exemplary embodiment, foot pedal 36 may also be connected to the frame 52 and/or wheels of bed 70 such that actuation of pedal 36 induces braking of the other castors and/or wheels of bed 70.

Figure 8A:
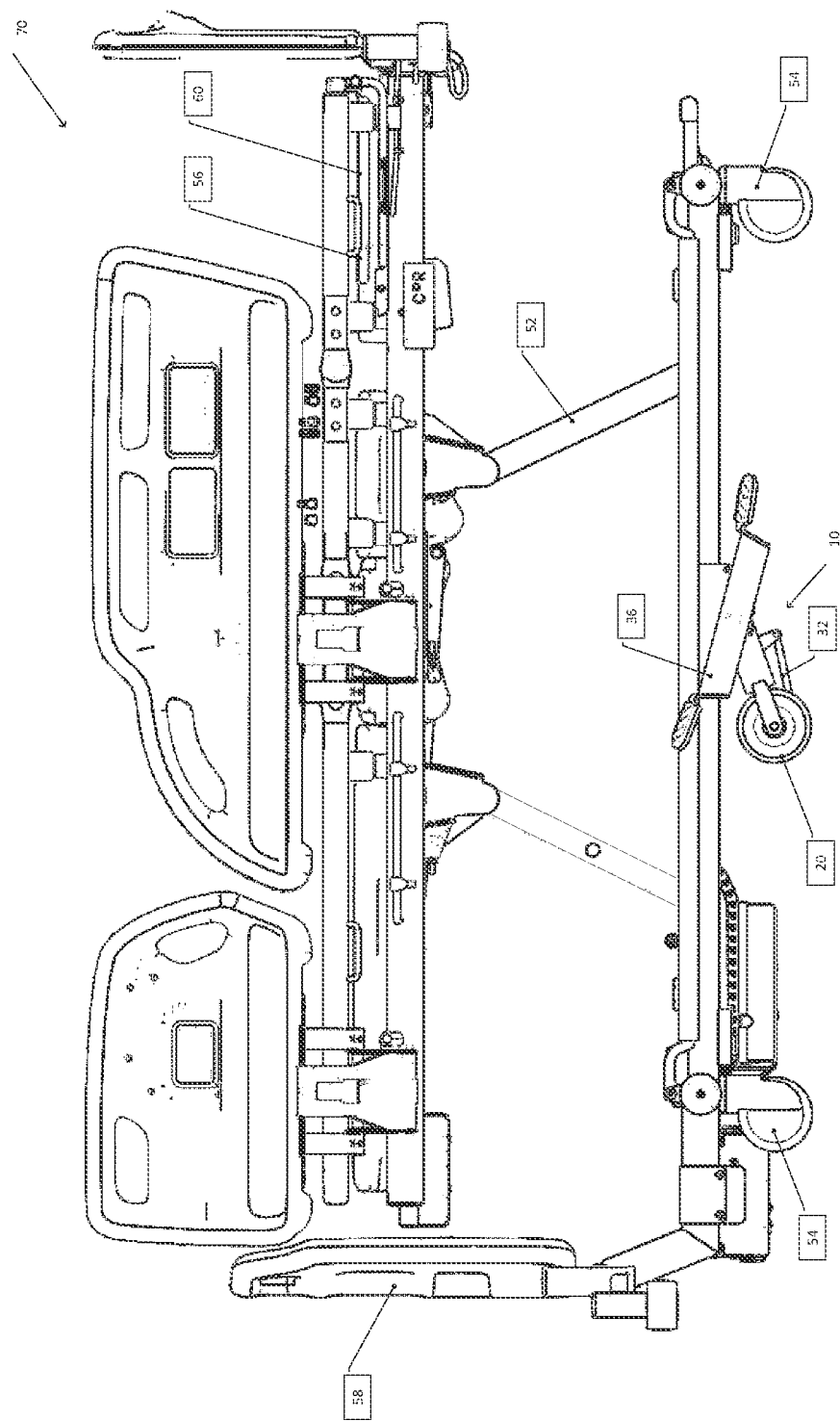

Referring to FIGS. 8A-8C, several views of the medical bed 70 including a retractable wheel system 10 in the down position are shown. The down position of the retractable wheel system 10 may be the same down position as previously described (see e.g., discussion of FIGS. 4A and 5A). In the down position, the retractable wheel 20 of the retractable wheel system 10 may be in contact with the ground and may roll along the ground as the medical bed 70 is pushed. The retractable wheel 20 may co-act with the plurality of wheels 54 when the medical bed 70 is being moved so as to improve steering and maneuverability of the medical bed 70. By using the retractable wheel 20 in the down position, the medical bed 70 may be more easily maneuvered in tight spaces, such as through doorways and around corners.

Figure 9A:
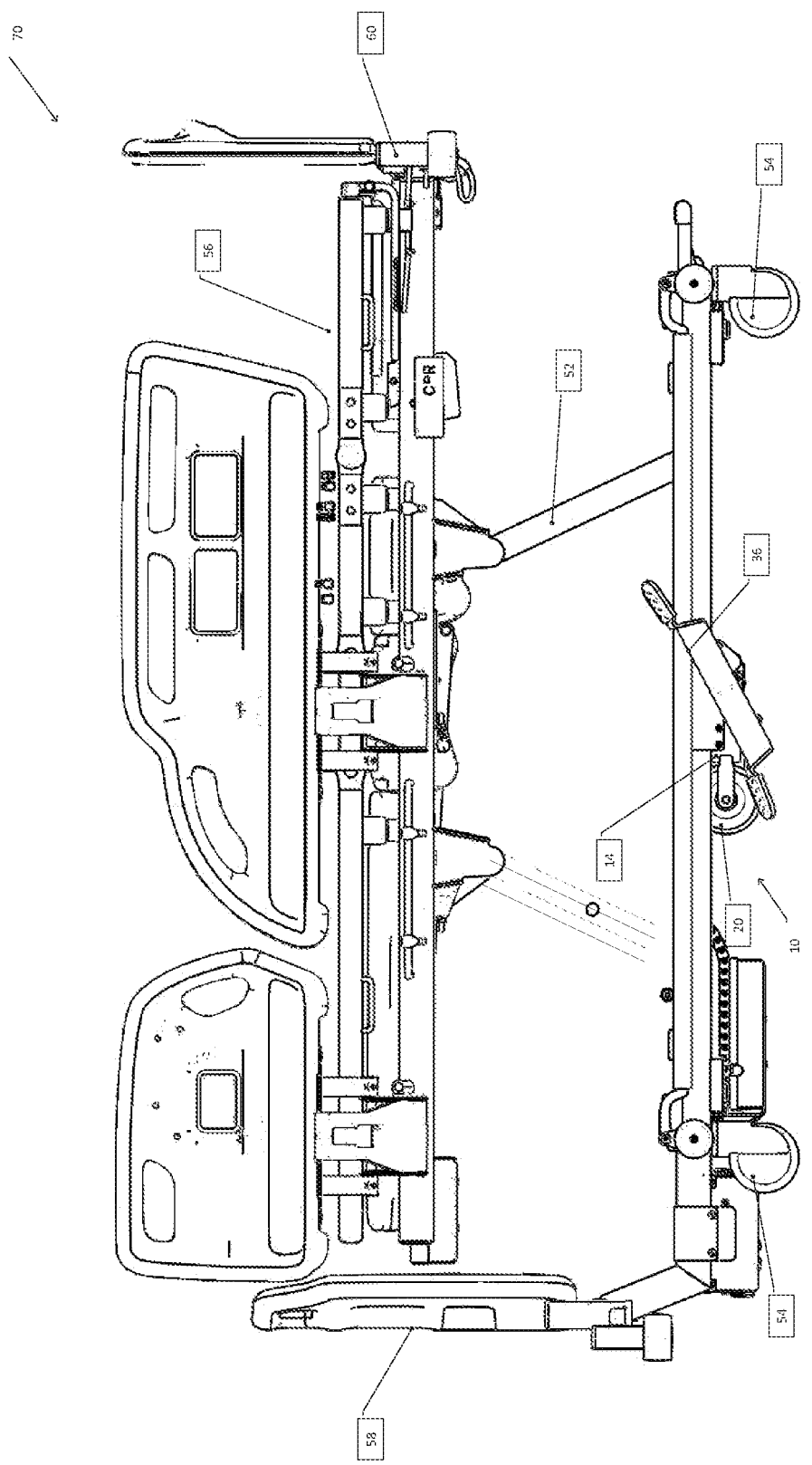
FIGS. 9A-9C show several views of a medical bed including a retractable wheel system according to various aspects of the present disclosure with the retractable wheel system in an up position.
Figure 9B:
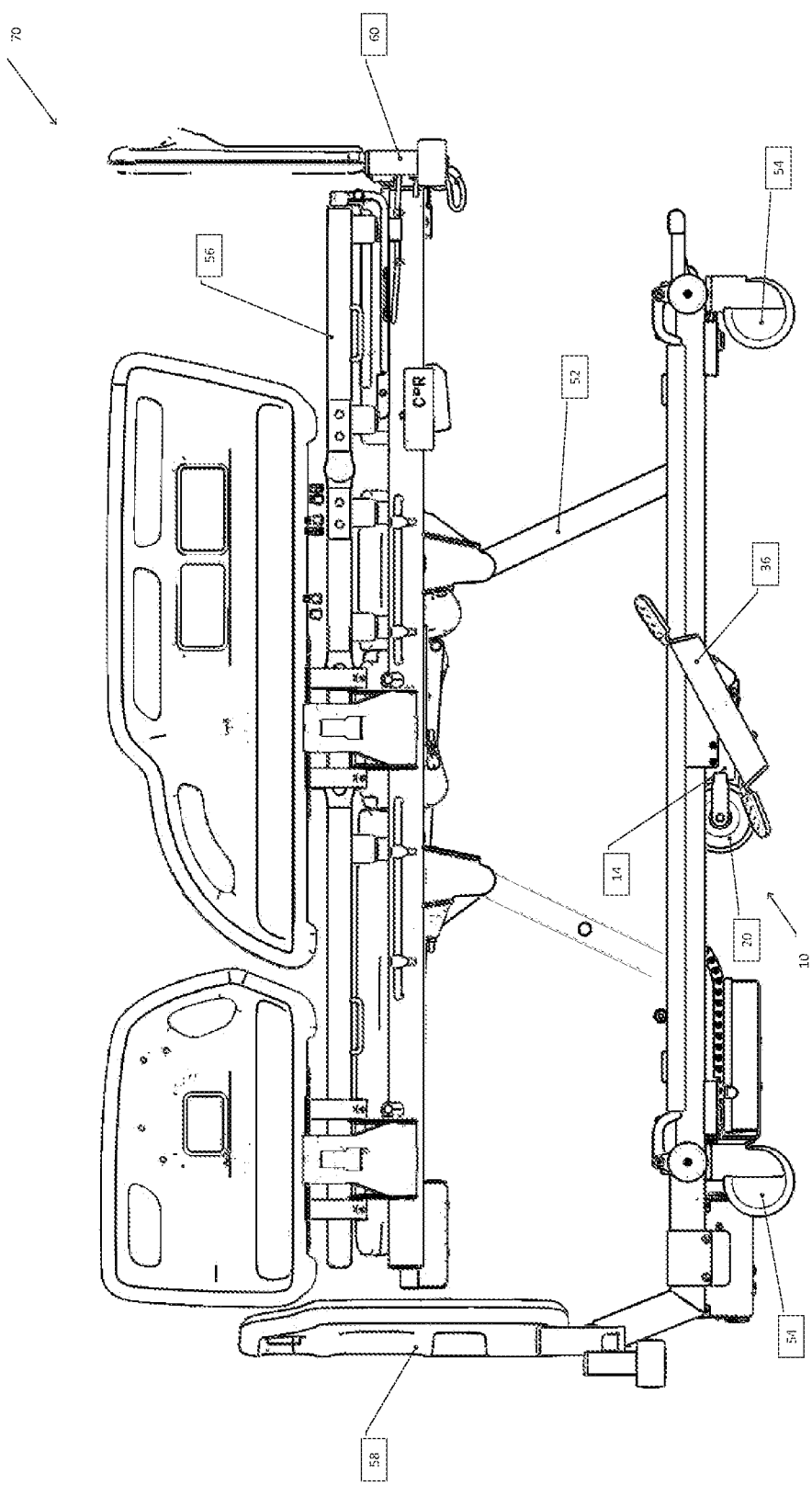
Figure 9C:
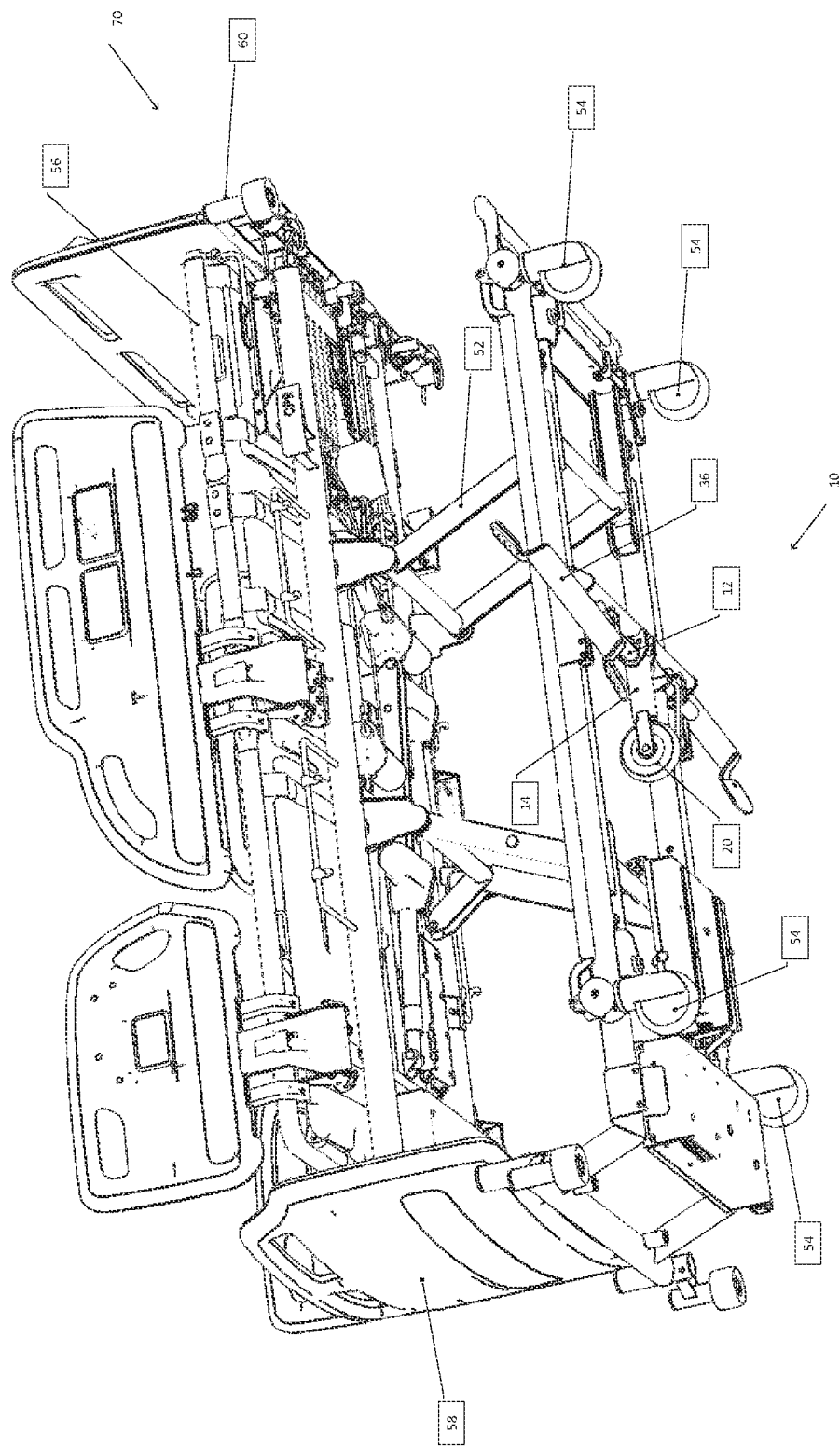

Referring to FIGS. 9A-9C, several views of the medical bed 70 including a retractable wheel system 10 in the up position are shown. The up position of the retractable wheel system 10 may be the same up position as previously described (see e.g., discussion of FIGS. 4B, 5B, and 5C). In the up position, the retractable wheel 20 of the retractable wheel system 10 may not be in contact with the ground. When the retractable wheel 20 is in the up position, the medical bed 70 may be moved as if there is no retractable wheel system 10 installed (e.g., operating the same as a medical bed 70 not having a retractable wheel 20 at all). The retractable wheel system 10 of the medical bed 70 may be moved between the down position and the up position as previously described.

With continued reference to FIGS. 8A-9C, the retractable wheel system 10 may be positioned proximate the center (lengthwise) of the medical bed 70, such as near the middle point between the foot end 58 and the head end 60. However, the retractable wheel system 10 may be positioned at any point along the length of the medical bed 70 that enhances steering or maneuverability of the medical bed 70 when the retractable wheel 20 rolls along the ground.

In some non-limiting embodiments, the retractable wheel system 10 may be designed as an integral component of the medical bed 70. However, in other non-limiting embodiments, the retractable wheel system 10 may be a separate removable system or component and may be retrofitted onto an existing medical bed 70 that was not designed to include the retractable wheel system 10. The retractable wheel system 10 may be of a compact and simple design so as to fit in the tight space between the plurality of wheels 54 and under the frame 52. The retractable wheel system 10 may be retrofitted on an existing medical bed 70 that does not have a retractable wheel system 10 by attaching the retractable wheel system 10 to the frame 52 of the medical bed 70 via a mounting unit 40, which may include brackets, clamps and/or other frame mounting elements. The rotatable member 12 of the retractable wheel system 10 may be attached to the frame 52 of the medical bed 40, and the rotatable pedal 36 may be attached to the rotatable member 12 so as to rotate the rotatable member 12 upon rotation of the rotatable member 36. The retractable wheel system 10, such as the rotatable member 12 thereof, may be attached to the frame 52 by any suitable attachment system, such as by bolts. The retractable wheel system 10 may also be removable from the medical bed 40 (e.g., the installed retractable wheel system 10 may subsequently be uninstalled).

In one exemplary embodiment shown in FIGS. 14-26, mounting unit 40 includes a transport unit clamp 41 that may be coupled to a portion of frame 52. For example, transport unit clamp 41 may be removably attached to two opposing supports of medical bed frame 52 extending along a length of the two opposing sides of the bed. In one embodiment, transport unit clamp 41 can be hung on, positioned over or otherwise coupled to opposing medical bed frame supports 52 and secured in place with clamp brackets or fasteners 43. Transport unit clamp 41 may also abut and/or rotatably receive at least a portion of rotatable member 12 to help stabilize and/or secure retractable wheel system 10. Transport unit clamp 41 further may be removably or fixedly attached to a mounting frame support 45, to which rotatable member 12 is connected via a rotatable member bracket 47. In one embodiment, rotatable member bracket 47 is welded or otherwise fixed to mounting frame support 45 and pivotably or rotatable received within a through hole of and/or is otherwise rotatably or pivotably coupled to rotatable member 12. In an exemplary embodiment, rotatable member bracket 47 may be configured as a housing for receiving, housing and/or assisting in positioning a portion of swing arm 14, such as first end 16. As shown in FIG. 3, rotatable member bracket 47 may be configured as a housing with a slot for receiving swing arm first end 16. Optionally, a bracket pin 49a and C-shaped latch 49b extending through rotatable member bracket 47 and corresponding stop coupled to rotatable member 12 may function in part to limit a downward rotation of swing arm 14 and wheel 20. Optionally, one or more stop member brackets 48 may be help restrict rotational movement of pedal 36 and/or swing arm 14 as well as facilitate alignment, stability and positioning of swing arm 14 and wheel 20. Stop member brackets 48 may be rotatably and/or fixedly connected to rotatable member 12 and mounting frame support 45. As shown in FIG. 6D, two stop member brackets 48 may be positioned on either side of rotatable member bracket 47, located between rotatable member bracket 47 and pedal 36. In an exemplary embodiment, retractable wheel system 10 may be removably attached to bed 70 by securing transport unit clamp 41 to opposing medical bed frame supports 52 with clamp brackets or fasteners 43.

Figure 10A:
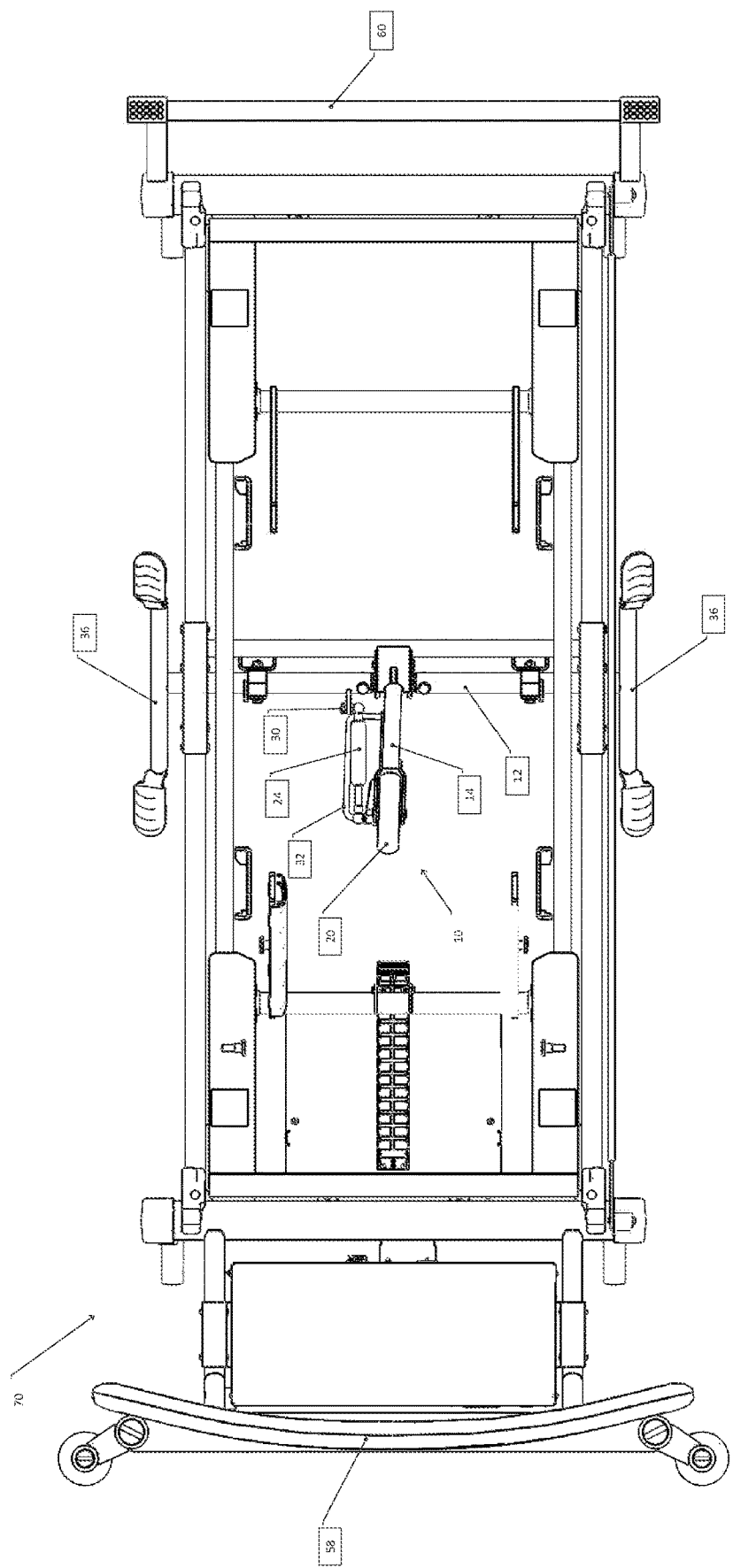
Figure 10B:
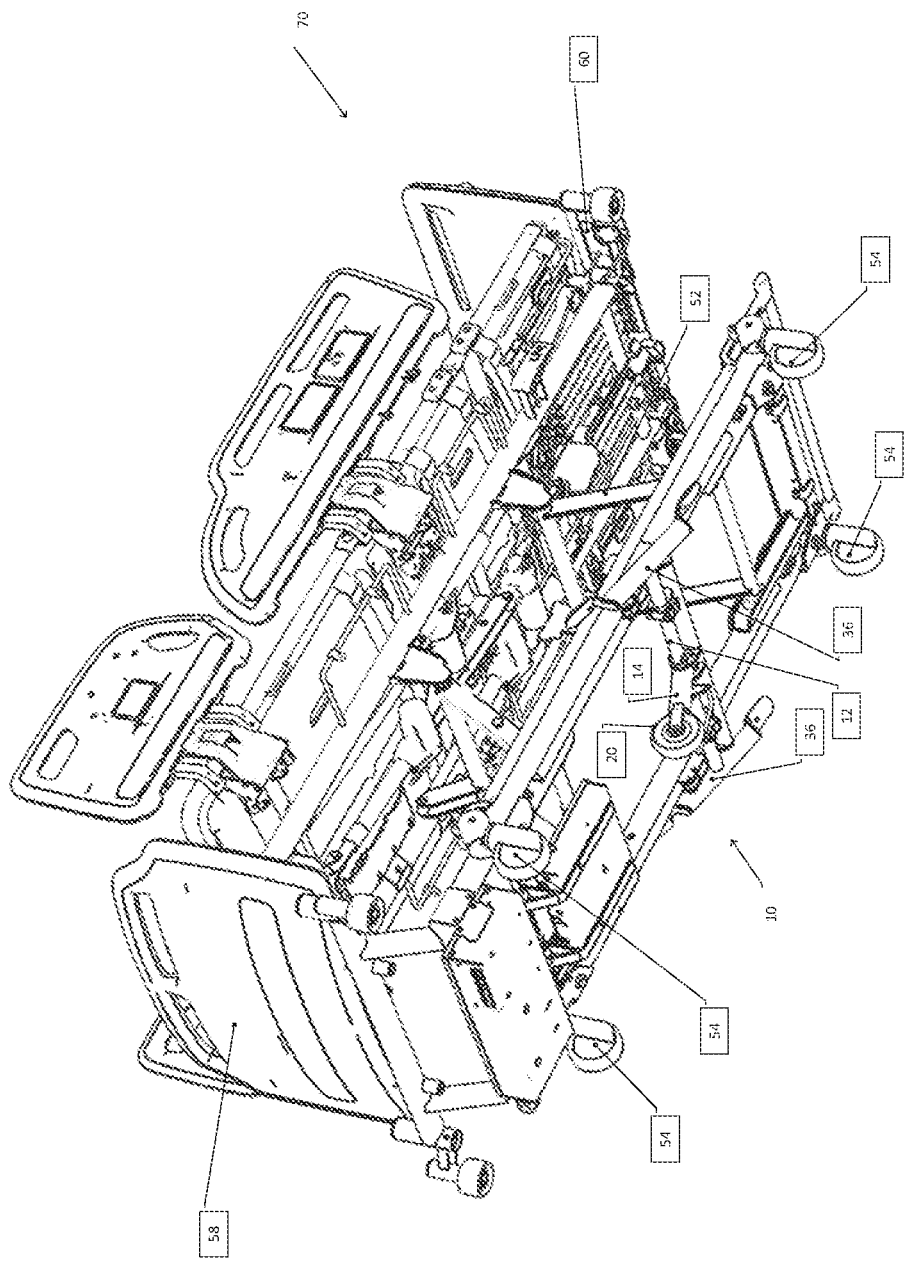
Figure 10C:
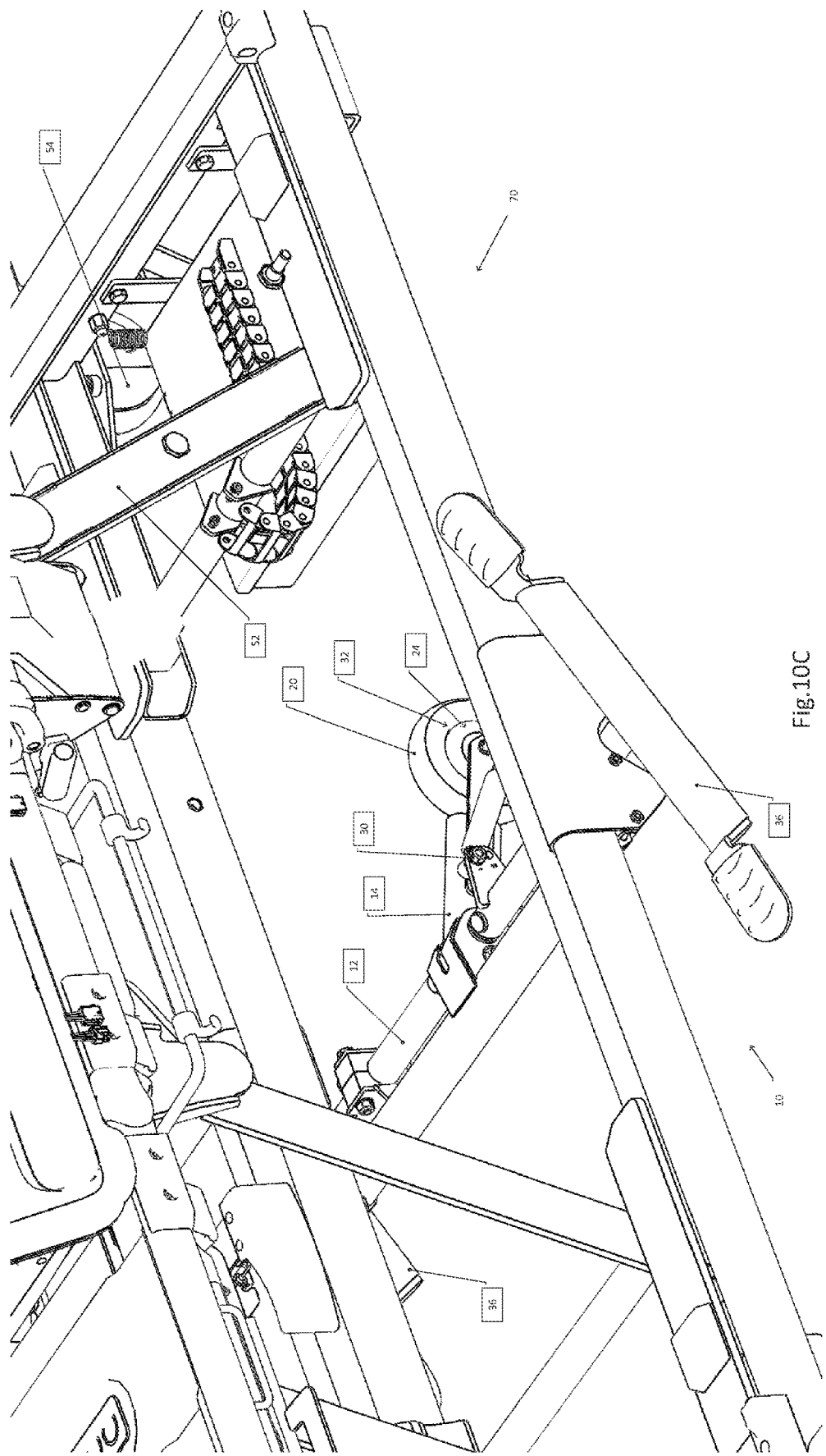
Figure 10D:
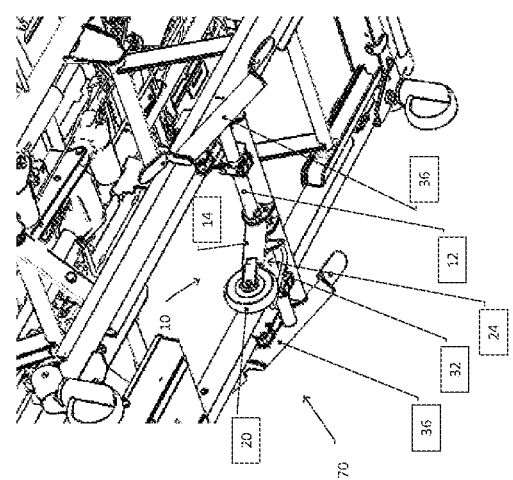
Figure 10E:
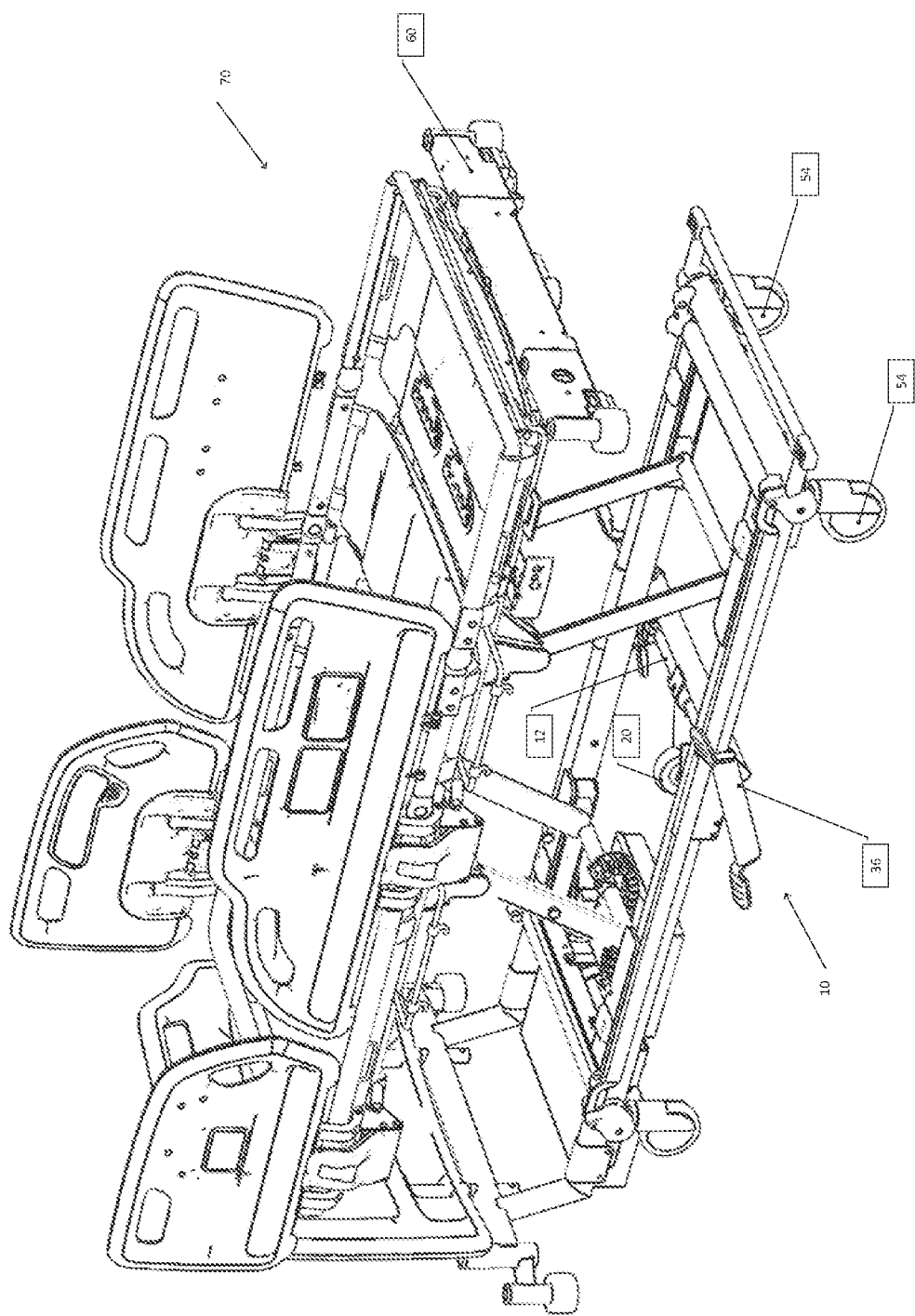
Figure 10F:
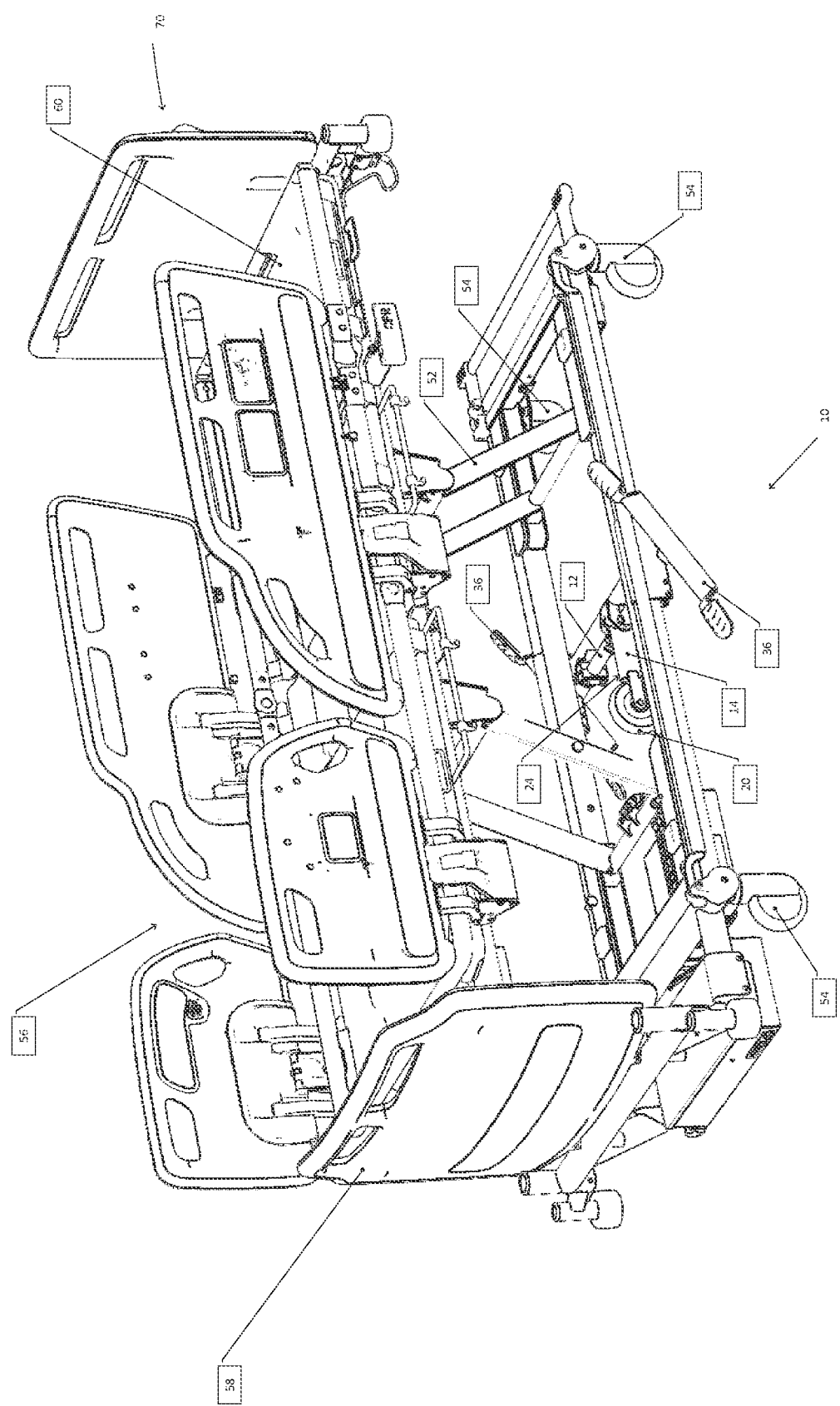

Referring to FIGS. 10A-10H, various views are shown of the medical bed 40 including the retractable wheel system 10 that illustrate the medical bed 40 including the retractable wheel system 10 from different angles. FIG. 10A is a bottom view of the medical bed 40 including the retractable wheel system 10. FIG. 10B is a perspective view of the medical bed 40 including the retractable wheel system 10. FIG. 10C is another perspective view of the medical bed 40 including the retractable wheel system 10. FIG. 10D is another perspective view of the medical bed 40 including the retractable wheel system 10. FIG. 10E is another perspective view of the medical bed 40 including the retractable wheel system 10. FIG. 10F is another perspective view of the medical bed 40 including the retractable wheel system 10. FIG. 10G is another perspective view of the medical bed 40 including the retractable wheel system 10. FIG. 10H is another perspective view of the medical bed 40 including the retractable wheel system 10.

Figure 11:
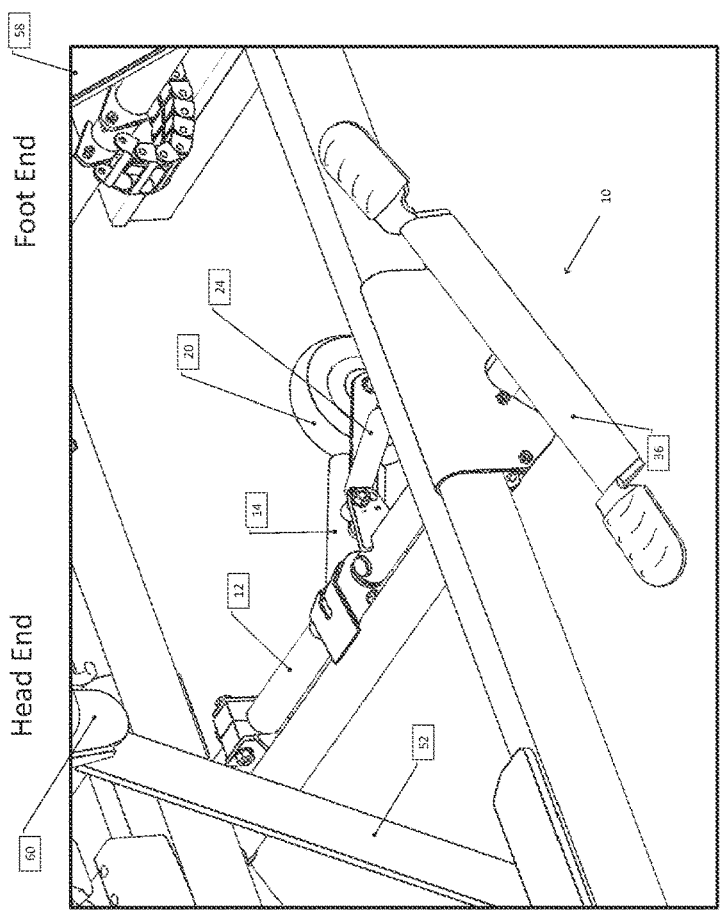
FIG. 11 shows a perspective view of a medical bed including a retractable wheel system according to one aspect of the present disclosure where the retractable wheel system co-acts with a rotatable pedal positioned between ends of the medical bed.

Referring to FIG. 11, a medical bed 40 having the retractable wheel system 10 is shown. In this non-limiting embodiment, the retractable wheel system 10 may be installed on the medical bed 40 between the foot end 58 and the head end 60, such as proximate or at the midpoint between the foot end 58 and the head end 60.

Figure 12:
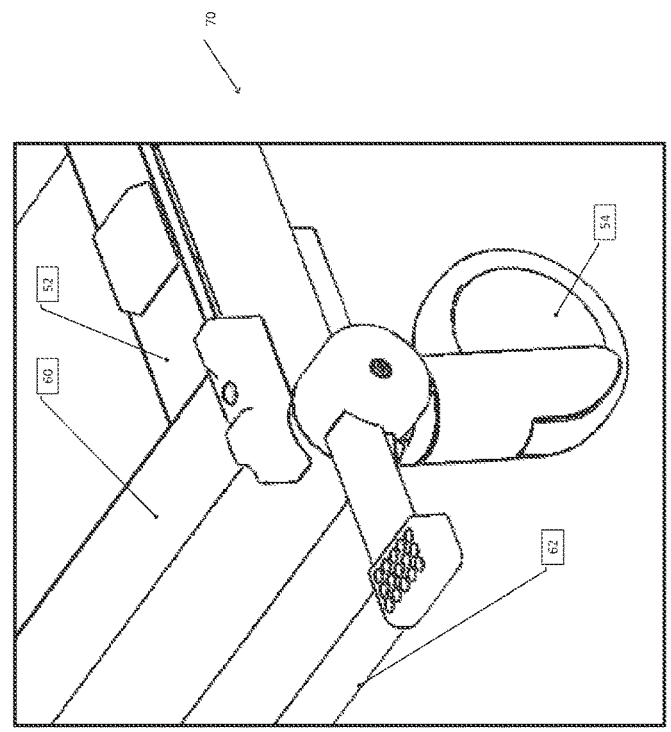
FIG. 12 shows a perspective view of a medical bed according to one aspect of the present disclosure having a brake for preventing rotation of a plurality of wheels of the medical bed.

Referring to FIG. 12, a perspective view of the medical bed 40 is shown having a brake 62. The brake 62 may co-act with at least one of the plurality of wheels 54 to, when applied, prevent the wheels 54 from rolling even when the medical bed 40 is pushed. The brake 62 may be released to allow the wheels 54 to roll when the medical bed 40 is pushed. The brake 62 may function as a safety feature to prevent movement of the medical bed 40 when applied. The brake 62 may be a manually applied brake, such as a pedal operable by the foot of a user. In other non-limiting embodiments, the brake 62 may be automatically applied, such as using an electromechanical arrangement.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent ranges that are within the spirit and scope of the appended claims. For example, it is to be understood that the present invention contemplates, to the extent possible, one or more features of any embodiment can be combined with one or more features of any other embodiment.

The invention claimed is:

1. A transportation unit comprising:
a frame;
a plurality of wheels attached to the frame; and
a retractable wheel system comprising:
a rotatable member attached to the frame;
a swing arm comprising a first end attached to the rotatable member and a second end attached to a wheel;
a swing mount attached to the rotatable member; and a spring member having a first end attached to the swing mount at a connection point and a second end attached to the second end of the swing arm, such that the spring member is rotatable relative to the swing mount at the connection point,
wherein the spring member is configured to apply a force in a downward direction when the connection point is above a line extending between a wheel attachment point and a swing arm rotation point,
wherein the wheel of the retractable wheel system is positioned between the plurality of wheels, wherein the line extends through an axis or centerline of the swing arm, and further comprising a first extended position in which the connection point is above the line and a second retracted position in which the connection point is below the line, wherein rotation of the rotatable member is configured to move the system between the first extended position to the second retracted position, and
wherein the transportation unit is a medical bed.

2. The transportation unit of claim 1, wherein the spring member is a gas spring.

3. The transportation unit of claim 1, wherein rotation of the rotatable member changes the position of the connection point relative to the line of the swing arm.

4. The transportation unit of claim 1, wherein rotation of the rotatable member is effected manually.

5. The transportation unit of claim 4, wherein manual rotation of the rotatable member is effected by a rotatable pedal co-acting with the rotatable member.

6. The transportation unit of claim 1, wherein rotation of the rotatable member is effected by a motor.

7. The transportation unit of claim 1, wherein the retractable wheel system does not include a locking mechanism to hold the system in the first extended position or the second retracted position.

8. The transportation unit of claim 1, wherein the plurality of wheels includes four wheels.

9. The transportation unit of claim 1, wherein the wheel of the retractable wheel system is positioned to steer the transportation unit during transportation of the transportation unit.

10. A retractable wheel system comprising:
a rotatable member;
a swing arm comprising a first end attached to the rotatable member and a second end attached to a wheel;
a swing mount attached to the rotatable member; and
a spring member having a first end attached to the swing mount at a connection point and a second end attached to the second end of the swing arm, such that the spring member is rotatable relative to the swing mount at the connection point,
wherein the spring member is configured to apply a force in a downward direction when the connection point is above a line extending between a wheel attachment point and a swing arm rotation point.

11. The system of claim 10, wherein the spring member is a gas spring.

12. The system of claim 10, wherein rotation of the rotatable member changes the position of the connection point relative to the line of the swing arm.

13. The system of claim 10, wherein the line extends through an axis or centerline of the swing arm, and further comprising a first extended position in which the connection point is above the line and a second retracted position in which the connection point is below the line, wherein rotation of the rotatable member is configured to move the system between the first extended position to the second retracted position.

14. The system of claim 13, wherein rotation of the rotatable member is effected manually.

15. The system of claim 14, wherein manual rotation of the rotatable member is effected by a rotatable pedal co-acting with the rotatable member.

16. The system of claim 13, wherein rotation of the rotatable member is effected by a motor.

17. The system of claim 13, wherein the system does not include a locking mechanism to hold the system in the first extended position or the second retracted position.

18. The system of claim 10, wherein the system is configured to be retrofitted onto a transportation unit.

19. The system of claim 18, wherein the transportation unit is a medical bed.

20. A method of attaching a retractable 5$^{th}$ wheel assembly to a bed comprising:
- providing a retractable wheel system comprising:
- a rotatable member;
- a swing arm comprising a first end attached to the rotatable member and a second end attached to a wheel;
- a swing mount attached to the rotatable member; and
- a spring member having a first end attached to the swing mount at a connection point and a second end attached to the second end of the swing arm, such that the spring member is rotatable relative to the swing mount at the connection point, wherein the spring member is configured to apply a force in a downward direction when the connection point is above a line extending between a wheel attachment point and a swing arm rotation point;
- providing a medical bed comprising a frame; and
- attaching the retractable wheel system to the frame.

* * * * *